United States Patent
Watanabe et al.

(10) Patent No.: US 9,963,603 B2
(45) Date of Patent: *May 8, 2018

(54) COLORED RESIN PARTICLE DISPERSION AND INKJET INK

(71) Applicant: RISO KAGAKU CORPORATION, Tokyo (JP)

(72) Inventors: Yoshifumi Watanabe, Ibaraki (JP); Kazuyuki Ando, Ibaraki (JP); Manami Shimizu, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 250 days.

This patent is subject to a terminal disclaimer.

(21) Appl. No.: 14/599,012

(22) Filed: Jan. 16, 2015

(65) Prior Publication Data
US 2015/0197650 A1 Jul. 16, 2015

(30) Foreign Application Priority Data
Jan. 16, 2014 (JP) ................... 2014-005729

(51) Int. Cl.
| | | |
|---|---|---|
| *C08L 1/18* | (2006.01) | |
| *C08L 29/04* | (2006.01) | |
| *C08L 29/14* | (2006.01) | |
| *C09B 67/08* | (2006.01) | |
| *C09B 67/46* | (2006.01) | |
| *C09D 11/023* | (2014.01) | |
| *C09D 11/106* | (2014.01) | |
| *C09D 11/14* | (2006.01) | |
| *C09D 11/36* | (2014.01) | |
| *G03G 9/12* | (2006.01) | |
| *G03G 9/13* | (2006.01) | |

(52) U.S. Cl.
CPC ............ *C09D 11/14* (2013.01); *C08L 1/18* (2013.01); *C08L 29/04* (2013.01); *C08L 29/14* (2013.01); *C09B 67/0004* (2013.01); *C09B 67/009* (2013.01); *C09D 11/023* (2013.01); *C09D 11/106* (2013.01); *C09D 11/36* (2013.01); *G03G 9/12* (2013.01); *G03G 9/131* (2013.01)

(58) Field of Classification Search
CPC ....... C09D 11/14; C09D 11/36; C09D 11/023; C09D 11/106; C09B 67/009; C09B 67/0004; C08L 29/04; C08L 29/14; C08L 1/18; G03G 9/12; G03G 9/131
See application file for complete search history.

(56) References Cited

U.S. PATENT DOCUMENTS

| | | |
|---|---|---|
| 3,383,352 A | 5/1968 | Duell et al. |
| 4,680,058 A | 7/1987 | Shimizu et al. |
| 4,762,568 A | 8/1988 | Nakamura et al. |
| 5,447,561 A | 9/1995 | Chiba et al. |
| 6,395,805 B1 | 5/2002 | Takao |
| 6,916,365 B1 | 7/2005 | Casper |
| 8,329,761 B2 | 12/2012 | Nair et al. |
| 2004/0006158 A1 | 1/2004 | Horie et al. |
| 2004/0147633 A1 | 7/2004 | Kamikubo et al. |
| 2004/0195711 A1 | 10/2004 | Hayashi et al. |
| 2007/0189998 A1 | 8/2007 | Nair et al. |
| 2009/0238606 A1 | 9/2009 | Ueno et al. |
| 2011/0009537 A1 | 1/2011 | Kotera et al. |
| 2011/0046298 A1 | 2/2011 | Hosoya et al. |
| 2011/0305880 A1 | 12/2011 | Nakamura et al. |
| 2012/0141747 A1 | 6/2012 | Deeter et al. |
| 2012/0266779 A1 | 10/2012 | Morinaga et al. |
| 2012/0289673 A1 | 11/2012 | Tsai et al. |
| 2013/0197144 A1 | 8/2013 | Katoh et al. |
| 2015/0197648 A1 | 7/2015 | Watanabe et al. |
| 2015/0197652 A1 | 7/2015 | Ando et al. |
| 2015/0197666 A1 | 7/2015 | Shimizu et al. |

FOREIGN PATENT DOCUMENTS

| | | |
|---|---|---|
| CN | 1435699 | 8/2003 |
| CN | 1517414 | 1/2004 |
| CN | 101273098 | 9/2008 |
| CN | 101539730 | 9/2009 |
| CN | 101760042 | 6/2010 |
| CN | 102015924 | 4/2011 |
| CN | 102137891 | 7/2011 |
| JP | 62-500597 | 3/1987 |

(Continued)

OTHER PUBLICATIONS

Definition of dye. Collins English Dictionary. http://www.collinsdictionary.com/dictionary/english/dye. As viewed on Mar. 17, 2016. (3 pages).
Definition of colorant. Hawley's Condensed Chemical Dictionary. John Wiley & Sons, Inc. 2007. (2 pages).
Guernelli, S.; Lagana, M.F.; Mezzina, E.; Ferroni, F.; Siani, G.; Spinelli, D. "Supramolecular complex formation: A study of the interactions between b-cyclodextrin and some different classes of organic compounds by ESI-MS, surface tension measurements, and UV/Vis and 1H NMR spectroscopy". European Journal of Chemistry, 2003, pp. 4765-4776.

(Continued)

*Primary Examiner* — Patrick D Niland
(74) *Attorney, Agent, or Firm* — Hamre, Schumann, Mueller & Larson, P.C.

(57) ABSTRACT

A colored resin particle dispersion and an ink are provided which exhibit excellent color development and abrasion resistance. Moreover, a colored resin particle dispersion and an inkjet ink are provided which exhibit excellent color development and abrasion resistance, together with excellent water resistance and marker resistance. Specifically provided are a colored resin particle dispersion containing colored resin particles, a basic dispersant, and a non-aqueous solvent, wherein the colored resin particles contain a colorant, and a phosphorylated solid resin and/or a nitrated solid resin. The phosphorylated solid resin may include a phosphorylated polyvinyl alcohol and/or a phosphorylated polyvinyl acetal, and the nitrated solid resin may include a nitrocellulose.

18 Claims, No Drawings

(56) References Cited

FOREIGN PATENT DOCUMENTS

| | | |
|---|---|---|
| JP | 8-234502 A | 9/1996 |
| JP | 2001-031900 | 2/2001 |
| JP | 2002-047440 | 2/2002 |
| JP | 2004-018736 | 1/2004 |
| JP | 2005-126587 | 5/2005 |
| JP | 2005-255911 | 9/2005 |
| JP | 2006-008849 | 1/2006 |
| JP | 2006-008850 | 1/2006 |
| JP | 2006-193648 | 7/2006 |
| JP | 2006-232990 | 9/2006 |
| JP | 2007-197632 | 8/2007 |
| JP | 2007-197633 | 8/2007 |
| JP | 2007-231106 A | 9/2007 |
| JP | 2007-231107 A | 9/2007 |
| JP | 2009-126995 | 6/2009 |
| JP | 2009-128741 | 6/2009 |
| JP | 2009-242649 A | 10/2009 |
| JP | 2009-249598 | 10/2009 |
| JP | 2010-033000 | 2/2010 |
| JP | 2010-270225 A | 12/2010 |
| JP | 2011-095643 | 5/2011 |
| JP | 2012-11740 | 1/2012 |
| JP | 2012-107229 A | 6/2012 |
| JP | 2012-224781 A | 11/2012 |
| JP | 2012-533650 A | 12/2012 |
| JP | 2014-19770 A | 2/2014 |
| JP | 2015-134852 | 7/2015 |
| JP | 6077772 B | 2/2017 |
| WO | 2004/003091 | 1/2004 |
| WO | 2011/144671 | 11/2011 |
| WO | 2013/005019 | 1/2013 |

OTHER PUBLICATIONS

Machine Translation of JP2009-249598A. Oct. 29, 2009 (8 pages).
Auschra, C.; Eckstein, E.; Knishka, R.; Pirrung, F.; Harbers, P. "Controlled polymers for pigment dispersants". European Coatings Journal. 2004. Issue 6. (9 pages).
Non-final Office Action dated Mar. 30, 2016, for U.S. Appl. No. 14/596,732, filed Jan. 14, 2015. (47 pages).
Search Report dated Jun. 8, 2015 in corresponding European patent application No. 15151104.5, 6 pages total.
Search Report dated Jun. 5, 2015 in corresponding European patent application No. 15151108.6, 5 pages total.
Search Report dated May 29, 2015 in corresponding European patent application No. 15151103.7, 5 pages total.
Search Report dated Jun. 12, 2015 in corresponding European patent application No. 15151105.2, 4 pages total.
Chinese Official Action, dated Jun. 28, 2016, Chinese Patent Application No. 201510020731.7 (7 pages).
Chinese Official Action, dated Jul. 1, 2016, Chinese Patent Application No. 201510020695.4 (7 pages).
Chinese Official Action, dated Jun. 29, 2016, Chinese Patent Application No. 201510020653.0 (6 pages).
Chinese Official Action, dated Jun. 28, 2016, Chinese Patent Application No. 201510020767.5 (6 pages).
Chinese Official Action, dated Jun. 28, 2016, Chinese Patent Application No. 201510020738.9 (6 pages).
Non-final Office Action dated Sep. 28, 2016 for U.S. Appl. No. 14/597,909, filed Jan. 15, 2015 (32 pages).
Sunohara et al., "Preparation of polyvinylpyrrolidone fine particles by inverse emulsification-evaporation process in solvent," Kobunshi Ronbunshu, 2005, vol. 62, No. 7, pp. 310-315 (English language abstract provided).
U.S. Appl. No. 14/596,732, filed Jan. 14, 2015.
U.S. Appl. No. 14/597,942, filed Jan. 15, 2015.
U.S. Appl. No. 14/597,909, filed Jan. 15, 2015.
U.S. Appl. No. 14/598,947, filed Jan. 16, 2015.
Final Office Action dated Nov. 10, 2016 for U.S. Appl. No. 14/596,732, filed Jan. 15, 2015 (40 pages).
Meislich, H. "Schaum's Outline of Theory and Problems of Organic Chemistry", 3rd Ed. New York: McGraw-Hill Professional, 1999, 3rd ed. (Schaum's Outline Series), ISBN: 9780071341653, pp. 42-45.
"WALSRODER solubility", Dow Answer Center, http://dowac.custhelp.com/app/answers/detail/a_id/8344/~/walsroder-solubility, As viewed on Oct. 21, 2016.
Search Report dated Jun. 10, 2015 in corresponding European patent application No. 15151106.0, 4 pages total.
Disperbyk 106 material data safety shee. Byk additives and instruments. Jun. 1, 2016 (10 pages).
U.S. Office Action. U.S. Appl. No. 14/596,732, dated Jun. 6, 2017 (43 pages).
Official Action, Japanese Patent Application No. 2014-005732; dated Apr. 25, 2017, (2 pages).
"Ricca Chemical Company Oxidation-Reduction Potential (ORP)", Jul. 12, 2005 (1 page), Available online at: URL: http://www.riccachemical.com/Documents/TRD19.pdf.
Official Action, European Patent Application No. 15151104.5, dated Aug. 7, 2017 (4 pages).
Official Action, Japanese Patent Application No. 2014-005729, dated May 16, 2017 (2 pages).
Final Office Action dated May 24, 2017, U.S. Appl. No. 14/597,942, filed Jan. 15, 2015 (32 pages).
Non-final Office Action dated Nov. 25, 2016 for U.S. Appl. No. 14/598,947, filed Jan. 16, 2015 (30 pages).
Official Action, Japanese Patent Application No. 2014-005753, dated Jul. 4, 2017 (3 pages).
Official Action for Japanese Patent Application No. 2014-005731, dated Feb. 21, 2017 (3 pages).
Japanese Official Action, Japanese Patent Application No. 2014-005726, dated Feb. 28, 2017 (3 pages).

COLORED RESIN PARTICLE DISPERSION AND INKJET INK

CROSS REFERENCE TO RELATED APPLICATIONS

This application is based upon and claims the benefit of priority from prior Japanese Patent Applications No. 2014-005729 filed on Jan. 16, 2014, the entire contents of which are incorporated by reference herein.

BACKGROUND OF THE INVENTION

Field of the Invention

The present invention relates to a colored resin particle dispersion and an inkjet ink.

Description of the Related Art

The colorants for printing inks can be broadly classified into dyes and pigments. Using a dye offers the advantage of particularly favorable color development. Further, compared with pigments, dyes offer the advantage of superior abrasion resistance, and particularly superior rub fastness. However, dyes themselves exhibit inferior water resistance and marker resistance. On the other hand, pigments offer the advantages of high image density and excellent weather resistance, but exhibit inferior abrasion resistance, and particularly rub fastness, compared with dyes.

In light of these properties, a method has been proposed in which by encapsulating the colorant within a resin to form colored resin particles, an ink can be provided which exhibits excellent abrasion resistance, water resistance and marker resistance, while retaining the image-forming properties of the colorant. It is desirable that the resin has properties which impart the ink with abrasion resistance, water resistance and marker resistance.

Patent Document 1, Patent Document 2 and Non-Patent Document 1 each proposes the production of a polymer particle dispersion in which by using an organic solvent A and an organic solvent B having almost no compatibility with the organic solvent A, forming a dispersion composed of a dispersed phase containing the organic solvent B and a resin and a continuous phase containing the organic solvent A, and then removing the organic solvent B from the dispersion under reduced pressure or heating, a polymer particle dispersion is produced containing polymer particles dispersed in the organic solvent A.

In other words, a method is proposed in which a liquid, prepared by dissolving and incorporating within the organic solvent B a resin that does not dissolve in the organic solvent A, is dispersed within a continuous phase of the organic solvent A, and the organic solvent B is then removed under reduced pressure or heating, thus obtaining a polymer particle dispersion in which polymer particles are dispersed stably within the organic solvent A.

In terms of the resin for the dispersed phase, styrene-maleic acid copolymer resins are used in the examples of Patent Document 1, styrene-maleic acid copolymer resins and polyvinylpyrrolidone are used in the examples of Patent Document 2, and polyvinylpyrrolidone is used in Non-Patent Document 1. These resins include resins having polar groups that undergo negative dissociation and resins having polar groups that undergo positive dissociation, thus forming polymer particles having negative and positive charges, and providing stable dispersions.

Patent Document 3 proposes the production of a polymer particle dispersion in which by using an organic solvent A and an organic solvent B having almost no compatibility with the organic solvent A, forming a dispersion composed of a dispersed phase containing the organic solvent B, a polyfunctional monomer or resin and a polymerization initiator, and a continuous phase containing the organic solvent A, subsequently initiating a crosslinking reaction by light or heat, and then removing the organic solvent B from the dispersion under reduced pressure or heating, a polymer particle dispersion is produced containing polymer particles dispersed in the organic solvent A.

Based on the above documents, it is hoped that polymer particle dispersions will enable the stable dispersion of polymer particles from the nano level to the micro level, for use as coloring materials not only in inks and copy toners, but also within all manner of coating materials, colored liquid crystals, color filters for portable terminals, electronic books and electronic papers.

[Patent Document 1] JP 2007-197632 A
[Patent Document 2] JP 2005-255911 A
[Patent Document 3] JP 2007-197633 A
[Non-Patent Document 1] Japanese Journal of Polymer Science and Technology, Vol. 62, No. 7, pp. 310 to 315 (July, 2005)

However, no investigations were conducted in the above documents regarding the abrasion resistance, the water resistance and the marker resistance of images printed on paper or the like when a printing ink was prepared using the above types of polymer particle dispersions. When a resin is used which provides improved abrasion resistance, water resistance and marker resistance for the ink, a problem arises in that maintaining the stability of the dispersion is problematic. Moreover, when the colorant is added in an amount sufficient to obtain satisfactory color development in the printed image, a problem arises in that the viscosity of the polymer particle dispersion increases, making preparation of the dispersion difficult.

Further, the method of Patent Document 3 requires a polymerization reaction of the polyfunctional monomer or resin within the dispersed phase, meaning more production steps are required in producing the polymer particle dispersion.

An object of the present invention is to provide a colored resin particle dispersion and an ink which exhibit excellent color development and abrasion resistance. Moreover, another object of the present invention is to provide a colored resin particle dispersion and an inkjet ink which exhibit excellent color development and abrasion resistance, together with excellent water resistance and marker resistance.

SUMMARY OF THE INVENTION

One aspect of the present invention is a colored resin particle dispersion comprising colored resin particles, a basic dispersant, and a non-aqueous solvent, wherein the colored resin particles comprise a colorant, and a phosphorylated solid resin and/or a nitrated solid resin.

Another aspect of the present invention is an inkjet ink comprising the above colored resin particle dispersion.

EMBODIMENTS OF THE INVENTION

A colored resin particle dispersion according to one embodiment of the present invention (hereafter sometimes referred to as simply "the dispersion") comprises:

colored resin particles, a basic dispersant, and a non-aqueous solvent, wherein the colored resin particles comprise a colorant, and a phosphorylated solid resin and/or a nitrated solid resin (hereafter sometimes referred to as simply "the esterified solid resin").

As a result, a colored resin particle dispersion and an inkjet ink can be provided which exhibit excellent color development and abrasion resistance.

According to this embodiment, by incorporating a phosphorylated solid resin and/or a nitrated solid resin in the colored resin particles, the esterified solid resin and the colorant can be blended uniformly, and the color development properties of the colorant can be enhanced.

In the production process for the colored resin particles, by adding the esterified solid resin to the solvent together with the colorant and performing mixing, the system can be stabilized, and each of the components can be blended more uniformly. Particularly when the colored resin particle dispersion is produced using an oil-in-oil emulsion, by adding the esterified solid resin to the solvent together with the colorant and using the resulting mixture as the dispersed phase, the emulsion stability can be enhanced, and as a result, each of the components of the colored resin particles can be blended more uniformly.

Further, by encapsulating the colorant in the esterified solid resin, the abrasion resistance of the printed items can be enhanced. By using the esterified solid resin, the colorant and the esterified solid resin can be blended more uniformly and stably, and therefore the abrasion resistance can be enhanced. In particular, the rub fastness can be improved.

Furthermore, by encapsulating the colorant in the esterified solid resin, the marker resistance of the printed items can also be enhanced. When a printed item is marked with a marker, the printed item is scraped by the marker, and in some cases the solvent incorporated within the marker and the ink may act upon the printed item. By encapsulating the colorant in the esterified solid resin, the rub fastness and the solvent resistance can both be further enhanced. By using the esterified solid resin, the colorant and the esterified solid resin are blended more uniformly and stably, and therefore the rub fastness and the solvent resistance can be further enhanced, and the marker resistance can be further improved.

Further, even in those cases where a resin having water resistance is used as the esterified solid resin, because the resin has been esterified, the colorant and the esterified solid resin can be blended in a more stable manner. As a result, by using an esterified solid resin having water resistance, a colored resin particle dispersion can be provided which not only yields excellent color development and abrasion resistance for the printed items, but also yields excellent water resistance.

(Colored Resin Particles)

The colored resin particles in the present embodiment comprise a colorant, and (1) a phosphorylated solid resin and/or (2) a nitrated solid resin.

These colored resin particles preferably have a particle shape in which the colorant and the esterified solid resin are mixed uniformly.

—Esterified Solid Resin

The esterified solid resin is preferably a resin that is solid at room temperature (23° C.). Hereafter, resins that are solid at room temperature (23° C.) are sometimes referred to as "solid resins".

In order to ensure stability of the particle shape, the glass transition temperature (Tg) of the esterified solid resin is preferably at least 30° C., and more preferably 40° C. or higher.

The glass transition temperature of the esterified solid resin is not particularly limited, but is preferably not higher than 150° C., and is more preferably 120° C. or lower.

Further, in order to ensure stability of the particle shape, the melting temperature (Tm) of the esterified solid resin is preferably at least 30° C., and more preferably 40° C. or higher. The melting temperature of the esterified solid resin is not particularly limited, but is preferably not higher than 250° C., and is more preferably 200° C. or lower.

By ensuring that the solubility of the esterified solid resin at 23° C. in the non-aqueous solvent contained in the colored resin particle dispersion is not more than 3 g/100 g, the shape stability of the colored resin particles in the dispersion can be maintained. This solubility is more preferably 0.5 g/100 g or less. It is even more preferable that, in the blend proportions used in the colored resin particle dispersion, the esterified solid resin is essentially insoluble in the non-aqueous solvent.

The solubility of the esterified solid resin in water at 23° C. is preferably not more than 3 g/100 g, and more preferably 0.5 g/100 g or less. This enables the water resistance of the colored resin particles to be further enhanced, meaning printed items having superior water resistance can be provided.

The esterified solid resin preferably has a Hansen solubility parameter (HSP value) of 22 to 27 MPa/cm$^3$. Further, the esterified solid resin preferably has a dispersion parameter $\delta d$ of 13 to 20, a polar parameter $\delta p$ of 5 to 12, and a hydrogen bonding parameter $\delta h$ of 10 to 20. By ensuring these ranges are satisfied, the colored resin particles and the non-aqueous solvent can be separated rapidly when an ink composed of the colored resin particle dispersion is applied to a paper, thus enabling a greater improvement in the abrasion resistance.

The method used for calculating the solubility parameter is described below. In the present invention, the three-dimensional solubility parameter proposed by Hansen in 1967 is used.

The Hansen solubility parameter divides the solubility parameter introduced by Hildebrand into 3 components, namely the dispersion parameter $\delta d$, the polar parameter $\delta p$, and the hydrogen bonding parameter $\delta h$, and is represented within a three-dimensional space. The dispersion parameter indicates the effects due to dispersive forces, the polar parameter indicates the effects due to dipolar intermolecular forces, and the hydrogen bonding parameter indicates the effects due to hydrogen bonding forces. A more detailed description is provided in "Polymer Handbook. Fourth Edition (Editors: J. Brandrup, E. H. Immergut, and E. A. Grulke)" or the like.

As described below, the Hansen solubility parameter can be determined experimentally.

First, the solubility (10 mass %) of a target substance (such as the esterified solid resin) in the solvents shown in Table 1, for which the dispersion parameter $\delta d$, the polar parameter $\delta p$ and the hydrogen bonding parameter $\delta h$ are already known, is investigated. Subsequently, the ranges (minimum values and maximum values) for the dispersion parameter $\delta d$, the polar parameter $\delta p$ and the hydrogen bonding parameter $\delta h$ that correspond with those solvents which dissolve the target substance are determined, and the values in the middle of those ranges (the central values of the three-dimensional solubility parameter ranges) are used as the three-dimensional solubility parameters for the target substance. In other words, the largest rectangular prism for which good solvents fall inside the prism and poor solvents fall outside the prism is determined, and the center of that rectangular prism is defined as the solubility parameter (HSP value) for the target substance.

dispersion parameter $\delta d = (\delta d_{max} - \delta d_{min})/2$ polar parameter $\delta p = (\delta p_{max} - \delta p_{min})/2$ hydrogen bonding parameter $\delta h = (\delta h_{max} - \delta h_{min})/2$ $HSP^2 = \delta d^2 + \delta p^2 + \delta h^2$ The solvents selected for the solubility tests preferably have solubility parameters (HSP values) positioned in very different three-dimensional spaces. Table 1 shows the solubility parameter (HSP value), the dispersion parameter δd, the polar parameter δp and the hydrogen bonding parameter δh for various solvents.

TABLE 1

List of solvents used in solubility tests

| Solvent | HSP (MPa/cm³) | δd | δp | δh |
|---|---|---|---|---|
| n-heptane | 15.3 | 15.3 | 0.0 | 0.0 |
| tetrachloroethylene | 18.7 | 18.0 | 5.0 | 0.0 |
| cyclohexane | 16.8 | 16.8 | 0.0 | 0.2 |
| toluene | 18.2 | 18.0 | 1.4 | 2.0 |
| tetrahydronaphthalene | 19.8 | 19.6 | 0.0 | 2.9 |
| α-bromonaphthalene | 20.9 | 20.3 | 3.1 | 4.1 |
| diisobutyl ketone | 16.9 | 16.0 | 3.7 | 4.1 |
| propylene carbonate | 27.3 | 20.1 | 18.0 | 4.1 |
| methyl isobutyl ketone | 17.0 | 15.3 | 6.1 | 4.1 |
| methyl ethyl ketone | 19.1 | 16.0 | 9.0 | 5.1 |
| chloroform | 18.9 | 17.8 | 3.1 | 5.7 |
| acetonitrile | 24.4 | 15.3 | 18.0 | 6.1 |
| dichloromethane | 20.2 | 18.2 | 6.3 | 6.1 |
| butyl acetate | 17.4 | 15.8 | 3.7 | 6.3 |
| acetone | 19.9 | 15.5 | 10.4 | 7.0 |
| ethyl acetate | 18.2 | 15.8 | 5.3 | 7.2 |
| N-methylpyrrolidone | 23.0 | 18.0 | 12.3 | 7.2 |
| 1,4-dioxane | 20.5 | 19.0 | 1.8 | 7.4 |
| γ-butyrolactone | 26.3 | 19.0 | 16.6 | 7.4 |
| tetrahydrofuran | 19.5 | 16.8 | 5.7 | 8.0 |
| propylene glycol monomethyl ether acetate | 19.3 | 15.6 | 5.6 | 9.8 |
| dimethyl sulfoxide | 26.7 | 18.4 | 16.4 | 10.2 |
| butyl carbitol | 20.4 | 16.0 | 7.0 | 10.6 |
| diacetone alcohol | 20.8 | 15.8 | 8.2 | 10.8 |
| dimethylformamide | 24.9 | 17.4 | 13.7 | 11.3 |
| propylene glycol monomethyl ether | 20.4 | 15.6 | 6.3 | 11.6 |
| 2-ethylhexanol | 20.2 | 16.0 | 3.3 | 11.9 |
| 2-ethylbutanol | 21.2 | 15.8 | 4.3 | 13.5 |
| cyclohexanol | 22.4 | 17.4 | 4.1 | 13.5 |
| n-pentanol | 21.7 | 16.0 | 4.5 | 13.9 |
| 2-phenoxyethanol | 23.5 | 17.8 | 5.7 | 14.3 |
| 1-butanol | 23.2 | 16.0 | 5.7 | 15.8 |
| methyl cellosolve | 24.8 | 16.2 | 9.2 | 16.4 |
| isopropyl alcohol | 23.6 | 15.8 | 6.1 | 16.4 |
| n-propanol | 24.6 | 16.0 | 6.8 | 17.4 |
| dipropylene glycol | 26.4 | 16.5 | 10.6 | 17.7 |
| ethanol 99.9% | 26.5 | 15.8 | 8.8 | 19.4 |
| diethylene glycol | 29.1 | 16.6 | 12.0 | 20.7 |
| methanol | 29.6 | 15.1 | 12.3 | 22.3 |
| water | 47.9 | 15.5 | 16.0 | 42.4 |

(1) A resin obtained by a condensation reaction between a phosphoric acid and a resin having hydroxyl groups can be used as the phosphorylated solid resin.

Examples of the resin having hydroxyl groups include polyol resins and resins having phenolic hydroxyl groups. Specific examples include polyvinyl alcohols (PVA), polyvinyl acetal resins, alkylphenol resins, polyalkylene glycol derivatives, polyglycerol derivatives, cellulose, and cellulose derivatives. These resins may be used individually, or a combination of resins may be used.

Examples of the phosphoric acid include polyphosphoric acid, orthophosphoric acid, phosphorous acid and phosphorus oxychloride, as well as phosphorus pentoxide ($P_2O_5$) which represents an anhydride of these acids. These compounds may be used individually, or a combination of compounds may be used.

Examples of resins that can be used favorably as the phosphorylated solid resin include resins having a repeating unit represented by general formula (1) shown below.

[Chemical Formula 1]

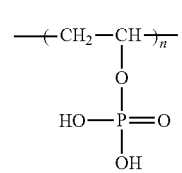

Specific examples of preferred phosphorylated solid resins include phosphorylated polyvinyl alcohols, phosphorylated polyvinyl acetal resins, and combinations thereof.

A phosphorylated polyvinyl alcohol can be obtained by a condensation reaction between a phosphoric acid and a polyvinyl alcohol. This causes phosphorylation of the hydroxyl groups of the polyvinyl alcohol.

The polyvinyl alcohol used as the raw material is generally produced using a polyvinyl acetate as a raw material, by substituting the acetate groups of the polyvinyl acetate with hydroxyl groups, and is therefore a resin which contains acetate groups as well as hydroxyl groups depending on the degree of substitution.

If the molar ratio of units having a hydroxyl group relative to the combined total of all the units that constitute the polyvinyl alcohol is termed n, and the molar ratio of units having an acetate group (—O—CO—CH$_3$) is termed m, then the degree of saponification is represented by (n/(n+m))×100, and the polymerization degree is represented by n+m.

The degree of saponification (n/(n+m))×100 for the polyvinyl alcohol is preferably at least 2, and more preferably 5 or greater. This ensures an adequate proportion of hydroxyl groups, meaning the phosphorylation can proceed.

On the other hand, the degree of saponification for the polyvinyl alcohol is preferably not more than 60, and is more preferably 50 or less. This ensures an adequate proportion of acetate groups, meaning the resin can be imparted with good water resistance.

The polymerization degree (n+m) of the polyvinyl alcohol is preferably from 10 to 1,000, and more preferably from 20 to 500.

The weight-average molecular weight (Mw) of the polyvinyl alcohol is preferably from 5,000 to 50,000, and is more preferably from 10,000 to 30,000. Within this range, the stability of the shape of the colored resin particles can be enhanced. Further, in the production process for the colored resin particles, the raw materials including the esterified solid resin can be mixed more uniformly with the solvent, and as a result, colored resin particles in which the components are more uniformly dispersed can be provided.

The weight-average molecular weight of the resin can be determined by the GPC method, and is calculated relative to standard polystyrenes. This also applies below.

Examples of commercially available polyvinyl alcohols that can be used include "Kuraray LM Polymer LM-20", "Kuraray LM Polymer LM-10HD", and "Kuraray LM Polymer LM-25" and the like manufactured by Kuraray Co., Ltd., "JMR-10L" and "JMR-20L and the like manufactured by Japan VAM & Poval Co., Ltd., and "LL-810", "LL-920", and "LL-940" and the like manufactured by The Nippon Synthetic Chemical Industry Co., Ltd.

When the polyvinyl alcohol described above is phosphorylated, the molar ratio of units having a phosphate ester group relative to the combined total of all the units that constitute the phosphorylated polyvinyl alcohol is preferably from 2 to 60, and more preferably from 5 to 50.

The units having a phosphate ester group are preferably introduced in an amount equivalent to the amount of hydroxyl groups in the polyvinyl alcohol. In the phosphorylated polyvinyl alcohol, by ensuring phosphorylation of essentially all of the hydroxyl groups, the number of hydroxyl groups can be reduced, and the water resistance can be improved. In the condensation reaction, the amount of phosphoric acid to be added can be determined from the number of hydroxyl group equivalents in the polyvinyl alcohol.

Specifically, the ratio of the number of moles of phosphorylated phosphate ester groups relative to the total number of moles of hydroxyl groups in the raw material polyvinyl alcohol (the phosphoric acid modification rate) is preferably at least 80 mol %, more preferably 90 mol % or greater, and even more preferably essentially 100 mol %.

However, when the polyvinyl alcohol described above is phosphorylated, some unreacted hydroxyl groups may remain within the phosphorylated polyvinyl alcohol.

A phosphorylated polyvinyl acetal resin can be obtained by a condensation reaction between a phosphoric acid and a polyvinyl acetal resin. This causes phosphorylation of the hydroxyl groups of the polyvinyl acetal resin.

The polyvinyl acetal resin used as the raw material is generally produced by acetalization of a polyvinyl alcohol (PVA) resin. Specifically, by reacting the PVA resin with an aldehyde in the presence of an acid catalyst, some or all of the hydroxyl groups of the PVA resin are acetalized, enabling production of a polyvinyl acetal resin.

The degree of saponification (n/(n+m)×100) of the polyvinyl alcohol required when preparing the polyvinyl acetal resin is preferably at least 2, and more preferably 5 or greater. This type of hydroxyl group proportion is most suited to acetalization.

Further, the polymerization degree (n+m) of the polyvinyl alcohol is preferably from 10 to 1,000, and more preferably from 20 to 500.

Examples of compounds that can be used as the aldehyde include formaldehyde, acetaldehyde, para-formaldehyde, trioxane, tetraoxane, propionaldehyde and butyraldehyde.

Furthermore, alicyclic aldehydes and aromatic aldehydes may also be used as the aldehyde.

Examples of the alicyclic aldehydes include cyclohexane carboxaldehyde, 5-norbornene-2-carboxaldehyde, 3-cyclohexene-1-carboxaldehyde, and dimethyl-3-cyclohexene-1-carboxaldehyde.

Examples of the aromatic aldehydes include 2,4,6-trimethylbenzaldehyde (mesitaldehyde), 2,4,6-triethylbenzaldehyde, 2,6-dimethylbenzaldehyde, 2-methylbenzaldehyde, 2-methoxy-1-naphthaldehyde, 2-ethoxy-1-naphthaldehyde, 2-propoxy-1-naphthaldehyde, 2-methyl-1-naphthaldehyde, 2-hydroxy-1-naphthaldehyde, 1-naphthaldehydes having other substituents, 2-naphthaldehydes having a substituent, 9-anthraldehyde, and 9-anthraldehydes having a substituent.

A ketone may be used in addition to, or instead of, the aforementioned aldehyde.

Examples of the ketone include acetophenones such as 2-methylacetophenone and 2,4-dimethylacetophenone, and naphthones such as 2-hydroxy-1-acetonaphthone, 8'-hydroxy-1'-benzonaphthone and acetonaphthone.

These aldehydes and ketones may be used individually, or combinations may be used.

The polyvinyl acetal resin preferably has a degree of acetalization of 40 to 95 mol %, and more preferably 50 to 85 mol %. This ensures that when the esterified solid resin is mixed with the colorant and the solvent and the like during the production process for the colored resin particles, the solubility of the esterified solid resin in the solvent can be improved. As a result, the uniformity of the components within the colored resin particles and the stability of the shape of the particles can be enhanced.

The degree of acetalization of the polyvinyl acetal resin can be represented by the proportion of hydroxyl groups within the polyvinyl alcohol resin that have been acetalized. In the case of a polyvinyl butyral resin, the degree of acetalization can be measured in accordance with JIS K6728.

When the polyvinyl alcohol resin is acetalized with butyraldehyde, this degree of acetalization can be termed the degree of butyralization. This degree of butyralization preferably satisfies the same range as that mentioned above for the degree of acetalization.

In the polyvinyl acetal resin, the proportion of hydroxyl groups is preferably not more than 60 mol %, and more preferably 50 mol % or less. This ensures that when the esterified solid resin is mixed with the colorant and the solvent and the like during the production process for the colored resin particles, the solubility of the esterified solid resin in the solvent can be improved. As a result, the uniformity of the components within the colored resin particles and the stability of the shape of the particles can be enhanced.

Here, the proportion of hydroxyl groups in the solid resin can be represented by the ratio of the units having a hydroxyl group (mol) relative to the total of all the units (mol) that constitute the solid resin. This definition also applies below.

For the polyvinyl acetal resin, a polyvinyl butyral resin (hereafter sometimes referred to as simply a "butyral resin") obtained by acetalizing a polyvinyl alcohol resin with butyraldehyde, or a polyvinyl formal resin (vinylon) obtained by acetalizing a polyvinyl alcohol resin with formaldehyde can be used favorably.

Examples of commercially available polyvinyl butyral resins that can be used include "BL-2H", "BL-10", "BL-S", "BM-1", "BM-2", "MN-6", and "BX-L" and the like from the S-LEC B series manufactured by Sekisui Chemical Co., Ltd., and "16H", "20H", "30T", "30H", "30HH", "45M", and "45H" and the like from the Mowital B series manufactured by Kuraray Co., Ltd.

Examples of commercially available polyvinyl formal resins that can be used include "Vinylec K" and "Vinylec C" and the like from the Vinylec series manufactured by JNC Corporation, and Vinylon fiber and the like manufactured by Kuraray Co., Ltd.

These products may be used individually, or combinations of two or more products may be used.

When the polyvinyl acetal resin described above is phosphorylated, the molar ratio of units having a phosphate ester group relative to the combined total of all the units that constitute the phosphorylated polyvinyl acetal resin is preferably from 2 to 60, and more preferably from 5 to 50 or more.

The units having a phosphate ester group are preferably introduced in an amount equivalent to the amount of hydroxyl groups in the polyvinyl acetal resin. In the phosphorylated polyvinyl acetal resin, by ensuring phosphorylation of essentially all of the hydroxyl groups, the number of hydroxyl groups can be reduced, and the water resistance can be improved. In the condensation reaction, the amount of phosphoric acid to be added can be determined from the number of hydroxyl group equivalents in the polyvinyl acetal resin.

Specifically, the ratio of the number of moles of phosphorylated phosphate ester groups relative to the total number of moles of hydroxyl groups in the raw material polyvinyl acetal resin (the phosphoric acid modification rate) is preferably at least 80 mol %, more preferably 90 mol % or greater, and even more preferably essentially 100 mol %.

However, when the polyvinyl acetal resin described above is phosphorylated, some unreacted hydroxyl groups may remain within the phosphorylated polyvinyl acetal resin.

Next is a description of an example of a method of synthesizing the phosphorylated solid resin.

The phosphorylated solid resin can be obtained by reacting an aforementioned polyvinyl alcohol or polyvinyl acetal resin, or a combination thereof, with phosphoric anhydride ($P_2O_5$) and water.

The phosphoric anhydride is preferably added in an amount of 0.1 to 1.0 mol per 1 molar equivalent of hydroxyl groups within the resin.

The water is preferably added in a molar ratio of 1 to 2 mol per 1 mol of the phosphoric anhydride.

Organic solvents which do not have a hydroxyl group can be used favorably as the solvent used in the reaction.

Examples of such organic solvents include amide-based solvents such as N,N-dialkyl (meth)acrylamides, dimethylformamide (DMF) and N,N-dimethylacetamide (DMAc), and tetrahydrofuran (THF) and the like, which may be used individually or in combinations.

The reaction is preferably performed by adding the resin to the organic solvent, and then adding the water and the phosphoric anhydride. The reaction temperature can be adjusted within a range from 30 to 70° C. Filtering and/or washing are preferably performed to remove impurities from the reaction product.

(2) A resin obtained by a condensation reaction between nitric acid and a resin having hydroxyl groups can be used as the nitrated solid resin.

Examples of the resin having hydroxyl groups include polyol resins and resins having phenolic hydroxyl groups. Specific examples include polyvinyl alcohols, polyvinyl acetal resins, alkylphenol resins, polyalkylene glycol derivatives, polyglycerol derivatives, cellulose, and cellulose derivatives.

Specific examples of preferred nitrated solid resins include nitrocellulose, acetyl nitrocellulose, nitrate esters of carboxyalkyl celluloses such as carboxymethyl cellulose nitrate, and combinations of these resins. Among these resins, nitrocellulose is particularly preferred.

Examples of compounds that can be used as the nitrocellulose include nitrated cellulose compounds in which one, two, or all three of the hydroxyl groups in each glucose unit that constitutes the cellulose have been nitrated.

The degree of nitration of the nitrocellulose is preferably within a range from 10.7% to 12.2%, and is particularly preferably within a range from 10.7% to 11.4%. This enables the colored resin particle dispersion to be prepared in a more stable manner, and enables the color development and abrasion resistance of the printed items to be further enhanced.

Further, the ratio of the number of moles of nitrated nitrate ester groups relative to the total number of moles of hydroxyl groups in the raw material resin containing the hydroxyl groups (the nitric acid modification rate) is preferably from 10 to 80 mol %, and more preferably from 20 to 70 mol %.

The weight-average molecular weight of the nitrocellulose is preferably from 5,000 to 100,000, and more preferably from 10,000 to 75,000. Within this range, the stability of the shape of the colored resin particles can be enhanced. Further, in the production process for the colored resin particles, the raw materials including the nitrocellulose can be mixed more uniformly with the solvent, and as a result, colored resin particles in which the components are more uniformly dispersed can be provided.

The blend amount of the above esterified solid resin is preferably at least 10 mass %, and more preferably 20 mass % or greater, relative to the total mass of the colored resin particles.

On the other hand, the blend amount of the esterified solid resin is preferably not more than 70 mass %, and more preferably 50 mass % or less, relative to the total mass of the colored resin particles.

—Plasticizer

The colored resin particles may also include a liquid organic compound (hereafter sometimes referred to as simply a "plasticizer"). This enables the abrasion resistance of the printed items to be further enhanced.

The plasticizer lowers the softening region of the solid resin and imparts plasticity, and therefore by adding the plasticizer when the solid resin and the colorant of the colored resin particles are mixed, the solid resin and the colorant can be mixed together more uniformly. As a result, the components of the colored resin particles are blended more uniformly, and the abrasion resistance can be further enhanced.

The solubility of the plasticizer in the non-aqueous solvent at 23° C. is preferably not more than 3 g/100 g, which enables the solid resin of the colored resin particles to be imparted with plasticity, while preventing dissolution in the non-aqueous solvent, and enabling the shape stability of the colored resin particles to be maintained. Further, when the colored resin particle dispersion is produced, coalescence of the dispersed phase containing the solid resin and the colorant can be prevented, enabling the stability of the oil-in-oil emulsion to be further enhanced. As a result, the components of the colored resin particles can be dispersed more uniformly.

This solubility at 23° C. is more preferably 1 g/100 g or less, and even more preferably 0.5 g/100 g or less. It is most preferable that, in the blend proportions used in the colored resin particle dispersion, the plasticizer is essentially insoluble in the non-aqueous solvent.

The melting point of the plasticizer is preferably 23° C. or lower, and more preferably 15° C. or lower. This enables the solid resin and the colorant of the colored resin particles to be mixed together more uniformly.

The plasticizer may be a low molecular weight compound, a polymer compound, or a combination thereof.

Examples of compounds that can be used as the low molecular weight compound include alcohols, esters, and ethers and the like.

For the alcohols, lower polyhydric alcohols and/or higher polyhydric alcohols can be used favorably. The number of hydroxyl groups in these alcohols is preferably from 1 to 10.

The carbon number of the lower polyhydric alcohols is preferably from 4 to 6.

Specific examples of the lower polyhydric alcohols include diols such as 1,5-pentanediol, 1,6-hexanediol and 3-methyl-1,5-pentanediol.

The carbon number of the higher polyhydric alcohols is preferably from 10 to 250.

Specific examples of the higher polyhydric alcohols include polyols such as castor oil polyols.

For the esters, low molecular weight esters can be used favorably.

The carbon number of these low molecular weight esters is preferably from 8 to 30.

Specific examples of the low molecular weight esters include diisononyl phthalate, di-2-ethylhexyl adipate and diisononyl adipate.

High molecular weight compounds such as polyesters, polyethers and (meth)acrylic polymers can also be used favorably as the plasticizer.

The weight-average molecular weight of these high molecular weight compounds is preferably from 300 to 8,000, and more preferably from 1,000 to 5,000. This enables a good balance to be achieved between the shape stability and the plasticity of the colored resin particles.

Examples of the polyesters include polyester polyols obtained by subjecting a low molecular weight polyol and a dibasic acid to an esterification reaction, polycaprolactone, and poly-β-methyl-δ-valerolactone and the like.

Specific examples of the polyester polyols include adipic acid-diethylene glycol (AA-DEG), adipic acid-neopentyl glycol (AA-NPG), and adipic acid-trimethylolpropane/diethylene glycol (AA-TMP/DEG).

Examples of the polyethers include polyether polyols such as polyethylene glycol, polyoxypropylene glycol and poly(oxytetramethylene) glycol.

Examples of compounds that can be used as the (meth) acrylic polymer include not only (meth)acrylic resins having methacrylic units and/or acrylic units, but also copolymers having other units besides the methacrylic units and/or acrylic units. For example, vinyl acetate and styrene and the like can be used as other monomers.

Examples of commercially available (meth)acrylic polymers include "ARUFON UP-1010", "ARUFON UP-1190", "ARUFON UH-2000", "ARUFON UH-2190", "ARUFON UH-2041", "ARUFON UG-4010" and "ARUFON US-6100", all manufactured by Toagosei Co., Ltd.

These plasticizers may be used individually, or combinations of two or more plasticizers may be used.

Among the various possibilities, the use of polyesters, polyethers or (meth)acrylic polymers, either individually or in combinations, is preferable.

The blend amount of the aforementioned plasticizer is preferably from 5 to 40 mass % relative to the total mass of the colored resin particles.

—Other Solid Resin

In addition to the phosphorylated solid resin and nitrated solid resin described above, the colored resin particles may also include other solid resins.

Specific examples of these other solid resins include resins that have not been phosphorylated or nitrated among alkylphenol resins, polyvinyl alcohols (PVA), (meth)acrylic-based resins, styrene-(meth)acrylic-based resins, styrene-maleic acid resins, cellulose-based resins, polyvinyl acetal resins, polyamide resin such as methoxymethylated nylon, ketone resins, rosin resins, vinyl acetate resins, polyvinylpyrrolidones, alkoxy group-containing solid resins, polysilsesquioxanes, methoxysilsesquioxanes, ethoxysilsesquioxanes, and derivatives of these resins.

The above resins may be used individually, or a combination of two or more resins may be used.

The colored resin particles may also contain one or more other resins besides the resins described above, provided that the effects of the present invention are not impaired. As described below in the method of producing the colored resin particle dispersion, examples of these other resins include pigment dispersants and additives and the like.

—Colorant

The colorant incorporated in the colored resin particles may be either a pigment or a dye, or a combination of the two. Details are described below.

From the viewpoints of the coloring properties and the uniformity of the components, the colorant is preferably blended in an amount of 0.1 to 50 mass %, and more preferably 1 to 40 mass %, relative to the total mass of the colored resin particles.

The average particle size of the colored resin particles is preferably not more than about 10 μm, and is more preferably 5 μm or less, and even more preferably 1 μm or less. The average particle size of the colored resin particles may be adjusted appropriately in accordance with the type of recording medium, and for example in order to improve the color development and fixability for printed items using coated paper, this average particle size is preferably about 100 to 250 nm, and from the viewpoint of inhibiting show-through on printed items using plain paper, the average particle size is preferably 140 to 250 nm.

Here, the average particle size of the colored resin particles refers to the volume-based average particle size determined by a dynamic scattering method, and can be measured, for example, using a dynamic light scattering particle size distribution analyzer "LB-500" manufactured by Horiba, Ltd. This also applies below.

(Colored Resin Particle Dispersion)

The colored resin particle dispersion according to the present embodiment comprises a non-aqueous solvent and a basic dispersant in addition to the colored resin particles described above. The non-aqueous solvent and the basic dispersant are as described below in relation to the method of producing the colored resin particle dispersion. The non-aqueous solvent is preferably a solvent capable of dispersing the colored resin particles. The basic dispersant is added for the purpose of dispersing the colored resin particles in the non-aqueous solvent. Further, the basic dispersant is sometimes added to adjust the emulsion in the production process for the colored resin particles described below.

From the viewpoint of dispersibility, the basic dispersant is preferably added in an amount of 0.1 to 20 mass %, and more preferably 1 to 15 mass %, relative to the total mass of the dispersion.

In the colored resin particle dispersion according to the present embodiment, the amount of the colored resin particles relative to the total mass of the dispersion is preferably at least 1 mass %, more preferably 5 mass % or greater, and even more preferably 10 mass % or greater. This enables the dispersion to exhibit superior coloring properties as an ink, and also reduces the amount of solvent, thus enhancing the drying properties.

On the other hand, the amount of the colored resin particles relative to the total mass of the dispersion is preferably not more than 50 mass %, and is more preferably 40 mass % or less, and even more preferably 30 mass % or less. This enables the dispersibility and storage stability to be enhanced.

(Method of Producing Colored Resin Particle Dispersion)

Examples of the method of producing the colored resin particle dispersion of the present embodiment are described below. However, the colored resin particle dispersion according to the present embodiment is not limited to dispersions produced using the following production methods.

Methods of preparing the colored resin particle dispersion can be broadly classified into chemical methods and physicochemical methods. Examples of the chemical methods include interfacial polycondensation methods, interfacial reaction methods (in situ polymerization methods), and in-liquid cured coating methods (orifice methods). Examples of the physicochemical methods include in-liquid drying methods (in-water drying methods and in-oil drying methods), coacervation methods, and fusion dispersion cooling methods.

The colored resin particle dispersion according to the present embodiment can be prepared, for example, using one of the physicochemical methods mentioned above. In-liquid drying methods can be used favorably, and an in-oil drying method of an oil-in-oil emulsion can be used particularly favorably.

By using an in-oil drying method of an oil-in-oil emulsion, the materials described above can be used to prepare colored resin particles having a small average particle size and a narrow particle size distribution, and a colored resin particle dispersion having a low viscosity can be prepared. As a result, an ink that is particularly suited to inkjet discharge can be obtained, and an inkjet ink having excellent rub fastness can be obtained.

A colored resin particle dispersion produced using an in-oil drying method of an oil-in-oil emulsion can be obtained using a phase containing at least the basic dispersant and a non-aqueous solvent (hereafter the non-aqueous solvent of the continuous phase is sometimes referred to as "solvent A") as the continuous phase, and a phase containing at least the colorant, the esterified solid resin and a non-aqueous solvent (hereafter the non-aqueous solvent of the dispersed phase is sometimes referred to as "solvent B") as the dispersed phase, by dispersing the dispersed phase in the continuous phase to prepare an oil-in-oil (O/O) emulsion, and then removing the solvent B of the dispersed phase from the emulsion.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the esterified solid resin preferably has a higher solubility in the solvent B than in the solvent A.

—Continuous Phase

The continuous phase contains the solvent A and the basic dispersant.

The solvent A may be selected appropriately from all manner of non-aqueous solvents, so as to satisfy the relationships described below with an acidic dispersant, the solvent B and the solid resin.

Both non-polar organic solvents and polar organic solvents can be used as the non-aqueous solvent. These solvents may be used individually, or combinations of two or more solvents may be used, provided they form a single phase.

Examples of preferred non-polar organic solvents include petroleum-based hydrocarbon solvents such as aliphatic hydrocarbon solvents, alicyclic hydrocarbon solvents and aromatic hydrocarbon solvents. Examples of the aliphatic hydrocarbon solvents and alicyclic hydrocarbon solvents include paraffin-based, isoparaffin-based, and naphthene-based solvents. Specific examples include the solvents marketed under the product names listed below, including Teclean N-16, Teclean N-20, Teclean N-22, Naphtesol L, Naphtesol M, Naphtesol H, No. 0 Solvent L, No. 0 Solvent M, No. 0 Solvent H, Isosol 300, Isosol 400, AF Solvent No. 4, AF Solvent No. 5, AF Solvent No. 6, AF Solvent No. 7, and Cactus Normal Paraffin N12, N13, N14, YHNP and SHNP (all manufactured by JX Nippon Oil & Energy Corporation); and Isopar G, Isopar H, Isopar L, Isopar M, Exxsol D40, Exxsol D80, Exxsol D100, Exxsol D130 and Exxsol D140 (all manufactured by TonenGeneral Sekiyu K.K.). Examples of aromatic hydrocarbon solvents include Grade Alkene L and Grade Alkene 200P (both manufactured by JX Nippon Oil & Energy Corporation), and Solvesso 200 (manufactured by TonenGeneral Sekiyu K.K.). The 50% distillation point of the non-polar organic solvent is preferably at least 100° C., more preferably 150° C. or higher, and even more preferably 200° C. or higher. The 50% distillation point is measured in accordance with JIS K0066 "Test Methods for Distillation of Chemical Products", and represents the temperature at which 50% of the mass of the solvent has volatilized.

Among polar organic solvents, examples of preferred water-insoluble polar organic solvents include ester-based solvents, higher alcohol-based solvents and higher fatty acid-based solvents. Specific examples include ester-based solvents having a carbon number of 14 or higher within each molecule, such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; higher alcohol-based solvents having a carbon number of 8 or higher within each molecule, such as isomyristyl alcohol, isopalmityl alcohol, isostearyl alcohol and oleyl alcohol; and higher fatty acid-based solvents having a carbon number of 9 or higher within each molecule, such as isononanoic acid, isomyristic acid, hexadecanoic acid, isopalmitic acid, oleic acid and isostearic acid.

These solvents may be used individually, or a plurality of solvents may be combined.

Among these solvents, the solvent A is preferably a non-polar organic solvent, and is more preferably a naphthene-based, paraffin-based or isoparaffin-based hydrocarbon solvent.

The solvent A preferably has a Hansen solubility parameter (HSP value) of 14 to 18 MPa/cm$^3$. Further, the solvent A preferably has a dispersion parameter $\delta d$ of 12 to 20, a polar parameter $\delta p$ of 0 to 4, and a hydrogen bonding parameter $\delta h$ of 0 to 4.

By ensuring that the solubility parameters of the solvent A satisfy the above ranges, and that that the solubility parameters of the esterified solid resin of the colored resin particles satisfy the ranges described above, the dispersion stability of the colored resin particles in the solvent A can be improved. Further, when printing is performed using the colored resin particle dispersion, separation of the colored resin particles and the non-aqueous solvent on the paper can be accelerated, thereby enhancing the fixability of the colored resin particles to the paper and improving the abrasion resistance. This type of fixability effect manifests particularly strongly when printing to relatively impermeable papers such as coated papers.

In terms of the combination of the esterified solid resin and the solvent A, the ΔHSP value described below is preferably within a range from 14 to 25.

$$\Delta\text{HSP}^2 = (\delta d_{esterified\ solid\ resin} - \delta d_{solvent\ A})^2 + (\delta p_{esterified\ solid\ resin} - \delta p_{solvent\ A})^2 + (\delta h_{esterified\ solid\ resin} - \delta h_{solvent\ A})^2$$

By ensuring that these ΔHSP values satisfy the above ranges, the dispersion stability of the colored resin particles in the solvent A can be further improved, and the separation of the colored resin particles and the non-aqueous solvent on paper can be accelerated, thereby further improving the fixability to the paper.

The 50% distillation point of the solvent A is preferably not higher than 400° C., and is more preferably 300° C. or lower. On the other hand, in order to prevent volatilization of the solvent A and maintain the stability of the colored resin particle dispersion, the lower limit for the 50% distillation point of the solvent A is preferably at least 100° C., and more preferably 150° C. or higher.

The basic dispersant is a dispersant having a basic group. The basic dispersant preferably has a higher solubility in the solvent A than in the solvent B.

The solubility of the basic dispersant in the solvent B at 23° C. is preferably not more than 3 g/100 g, and more preferably 0.5 g/100 g or less. Further, the solubility of the basic dispersant in the solvent A at 23° C. is preferably at least 3 g/100 g, and more preferably 5 g/100 g or greater. It is even more preferable that the basic dispersant is selected so that, in the blend proportions used in the oil-in-oil emulsion, the basic dispersant dissolves essentially completely in the solvent A, and undergoes essentially no dissolution in the solvent B.

The basic dispersant is preferably a compound for which, when the basic dispersant is dissolved in a non-aqueous solvent, the oxidation-reduction potential (ORP value) decreases as the concentration of the basic dispersant increases.

For example, when the basic dispersant is dissolved in a solvent capable of dissolving the basic dispersant, it is preferable that the ORP value when the basic dispersant is dissolved in an amount of 5.0 mass % is lower than the ORP value when the basic dispersant is dissolved in an amount of 0.5 mass %.

Further, the ORP value when the basic dispersant is dissolved in dodecane in an amount of 5.0 mass % is preferably not higher than 0 mV.

On the other hand, if the basic dispersant includes an acidic group as well as the basic group, then the compound can still be used favorably as the basic dispersant, despite containing an acidic group, provided the ORP value exhibits this tendency to decrease. It is preferable that the basic dispersant does not contain an acidic group.

Examples of the basic group of the basic dispersant include an amino group, amide group and pyridyl group, and among these, an amino group is preferable. Further, other examples of the basic group of the basic dispersant include nitrogen-containing functional groups having a urethane linkage or the like. Furthermore, nitrogen-containing structural units such as a urethane linkage may be introduced into the basic dispersant.

Examples of the basic dispersant include modified polyurethanes, basic group-containing poly(meth)acrylates, basic group-containing polyesters, polyesteramines, quaternary ammonium salts, alkylamine salts such as stearylamine acetate, and fatty acid amine salts. These compounds may be used individually, or a plurality of compounds may be combined.

Examples of commercially available basic dispersants include "Solsperse 13940 (a polyester amine-based dispersant), 17000 and 18000 (fatty acid amine-based dispersants), and 11200, 22000, 24000 and 28000" (all product names), manufactured by Lubrizol Japan Ltd., "DISPERBYK-116, 2096 and 2163" (all product names), manufactured by BYK-Chemie Japan K.K., "ACETAMIN 24 and 86 (alkylamine salt-based dispersants)" (both product names), manufactured by Kao Corporation, and "DISPARLON KS-860 and KS-873N4 (high-molecular weight polyester amine salts) (both product names), manufactured by Kusumoto Chemicals, Ltd.

The basic dispersant preferably has a base value. The base value of the basic dispersant is preferably at least 1 mgKOH/g, more preferably 10 mgKOH/g or higher, and even more preferably 15 mgKOH/g or higher. This ensures that a fine and stable colored resin particle dispersion can be prepared.

Here, the base value describes the number of milligrams of potassium hydroxide equivalent to the amount of hydrochloric acid needed to neutralize all of the basic components contained within 1 g of the non-volatile fraction of the compound. This definition also applies below.

The basic dispersant preferably contains a (meth)acrylic block polymer having basic groups. Here, the term "(meth) acrylic block polymer" means both methacrylic block polymers and acrylic block polymers, and includes homopolymers containing only methacrylic units or acrylic units, and copolymers containing both methacrylic units and acrylic units.

By using a (meth)acrylic block polymer having basic groups as the basic dispersant, the viscosity of the colored resin particle dispersion can be suppressed to a low level, and the average particle size of the colored resin particles can be kept small. As a result, an ink that is particularly suited to inkjet discharge can be obtained.

One example of a preferred (meth)acrylic block polymer having basic groups is a block copolymer having a first block containing units having an alkyl group with a carbon number of 12 or greater, and a second block containing units having an amino group.

With this block copolymer, because the alkyl group portions exhibit good solvent affinity and the amino group portions exhibit good affinity with the colored resin particles, the dispersibility of the colored resin particles can be enhanced. Further, the emulsion stability when preparing the oil-in-oil emulsion can also be enhanced. Because of the block polymer structure, the alkyl group portions are localized, the alkyl group portions are readily orientated on the solvent side, and the solvent affinity can be further enhanced.

The alkyl group with a carbon number of 12 or greater may be either a linear or branched alkyl group, and specific examples include a dodecyl group, cetyl group, stearyl group, behenyl group, isododecyl group and isostearyl group.

These alkyl groups with a carbon number of 12 or greater may be incorporated in the first block either individually, or in combinations of two or more different groups.

Examples of groups that can be used as the amino group include groups represented by general formula —$NR^1R^2$, wherein each of $R^1$ and $R^2$ independently represents a hydrogen atom, a hydrocarbon group having a carbon number of 18 or less, or an alkanol group having a carbon number of 8 or less.

Examples of the hydrocarbon groups having a carbon number of 18 or less include chain-like hydrocarbon groups such as a methyl group, ethyl group, propyl group and butyl group, and cyclic hydrocarbon groups such as a cyclohexyl group and phenyl group. Examples of the alkanol group having a carbon number of 8 or less include an ethanol group and an isopropanol group.

The amino group is preferably a dialkanolamino group represented by general formula —N(HOR)$_2$ (wherein R represents a divalent hydrocarbon group).

Specific examples of the amino group include:
a primary amino group;
secondary amino groups such as a methylamino group, ethylamino group, propylamino group, butylamino group, cyclohexylamino group and phenylamino group; and
tertiary amino groups such as a dimethylamino group, diethylamino group, dipropylamino group, dibutylamino group, dicyclohexylamino group, diphenylamino group and pyridinyl group.

Further examples include alkanolamino groups such as a monomethylethanolamino group, diethanolamino group and diisopropanolamino group.

These groups may be used individually, or combinations of two or more groups may be used.

The molar ratio between the first block and the second block is preferably from 20:80 to 90:10, and more preferably from 30:70 to 70:30.

The (meth)acrylic block polymer having basic groups may be a block copolymer having one of each of the first block and the second block bonded to each other, or may be a block copolymer in which pluralities of the first block and the second block are bonded together in an alternating manner.

The proportion of units having an alkyl group with a carbon number of 12 or greater relative to all of the units of the first block is preferably at least 50 mol %, more preferably 55 mol % or greater, and even more preferably 60 mol % or greater. In order to improve the solvent affinity of the first block, the first block is preferably composed mainly of units having an alkyl group with a carbon number of 12 or greater.

The proportion of units having an amino group relative to all of the units of the first block is preferably less than 10 mol %, more preferably 5 mol % or less, and even more preferably 1 mol % or less, and it is particularly desirable that the first block contains essentially no units having an amino group. This enables the alkyl group portions of the first block to adopt an elongated configuration, thereby enhancing the solvent affinity.

The proportion of units having an amino group relative to all of the units of the second block is preferably at least 10 mol %, more preferably 20 mol % or greater, and even more preferably 30 mol % or greater. This enables the amino group portions to enhance the affinity with the colored resin particles.

On the other hand, the proportion of units having an amino group relative to all of the units of the second block is preferably not more than 95 mol %, and more preferably 70 mol % or less. This optimizes the orientation of the (meth)acrylic block polymer having basic groups relative to the colored resin particles, and means appropriate dispersibility can be obtained for the colored resin particles.

The proportion of units having an alkyl group with a carbon number of 12 or greater relative to all of the units of the second block is preferably from 10 to 90 mol %, more preferably from 20 to 80 mol %, and even more preferably from 30 to 70 mol %. However, the second block may contain no units having an alkyl group with a carbon number of 12 or greater.

The first and second blocks may each contain other groups besides the alkyl group with a carbon number of 12 or more and the amino group respectively. Examples of these other groups include alkyl groups having a carbon number of less than 12, and a benzyl group and the like.

One example of a preferred (meth)acrylic polymer having basic groups is a block copolymer having a block A of a monomer mixture a containing an alkyl (meth)acrylate (A) having an alkyl group with a carbon number of 12 or greater (hereafter also referred to as "monomer (A)"), and a block B of a monomer mixture b containing a reactive (meth)acrylate (B) having a functional group that can react with an amino group (hereafter also referred to as "monomer (B)") (hereafter this block copolymer is also referred to as simply a "(meth)acrylic block polymer"), wherein the functional group that can react with an amino group is reacted with an amino alcohol to introduce an amino group. Hereafter this block copolymer is sometimes referred to as simply an "amine-modified (meth)acrylic block polymer".

In this amine-modified (meth)acrylic block polymer, the introduced amino alcohol portions function as oil-in-oil emulsion interface adsorption groups, and also as adsorption groups for the colored resin particles, whereas the alkyl groups with a carbon number of 12 or greater exhibit good solvent affinity, and can enhance the emulsion stability of the oil-in-oil emulsion and the dispersibility of the colored resin particles.

Examples of the alkyl (meth)acrylate (A) having an alkyl group with a carbon number of 12 or greater include dodecyl (meth)acrylate, cetyl (meth)acrylate, stearyl (meth)acrylate, behenyl (meth)acrylate, isododecyl (meth)acrylate, and isostearyl (meth)acrylate. A plurality of these compounds may also be included. The carbon number of the alkyl group is preferably from 12 to 25.

Preferred examples of the functional group that can react with an amino group in the reactive (meth)acrylate (B) include a glycidyl group, vinyl group, and (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. A plurality of these compounds may also be included.

The monomer mixtures a and b may each include a copolymerizable monomer (C) other than the aforementioned monomer (A) or (B) respectively, provided that the effects of the present invention are not impaired.

Examples of this monomer (C) include styrene-based monomers such as styrene and α-methylstyrene; vinyl ether-based monomers such as vinyl acetate, vinyl benzoate and butyl vinyl ether; as well as maleate esters, fumarate esters, acrylonitrile, methacrylonitrile and α-olefins. Further, alkyl (meth)acrylates in which the alkyl chain length has a carbon number of less than 12, such as 2-ethylhexyl (meth)acrylate, isooctyl (meth)acrylate and tert-octyl (meth)acrylate can also be used. Furthermore, (meth)acrylates having a β-diketone group or a β-keto acid ester group, including acetoacetoxyalkyl (meth)acrylates such as 2-acetoacetoxyethyl (meth)acrylate, hexadione (meth)acrylate, and acetoacetoxyalkyl (meth)acrylamides such as acetoacetoxyethyl (meth)acrylamide can also be used. These monomers may be used individually, or a combination of two or more monomers may be used.

Examples of the amino alcohol include monomethylethanolamine, diethanolamine and diisopropanolamine. Among the various possibilities, from the viewpoint of providing two hydroxyl groups and thereby promoting the adsorption of the compound to the interface of the oil-in-oil emulsion, a dialkanolamine (secondary alkanolamine) represented by general formula $(HOR)_2NH$ (wherein R represents a divalent hydrocarbon group) is preferable. A combination of a plurality of these amino alcohols may also be used.

In order to enable the introduction of amino groups and ensure satisfactory dispersion of the colored resin particles, this amino alcohol is preferably reacted in an amount within a range from 0.05 to 1 molar equivalent, and more preferably from 0.5 to 1 molar equivalent, relative to the functional group that can react with an amino group in the aforementioned monomer (B). An amount of the amino alcohol of less than 1 molar equivalent means some unreacted functional groups will remain within the monomer (B), but it is thought that these residual functional groups function as adsorption groups for the colored resin particles.

The amount of the alkyl (meth)acrylate (A) in the above monomer mixture a is preferably at least 30 mass %, more preferably 40 mass % or greater, and even more preferably 50 mass % or greater. The monomer mixture a may be composed 100 mass % of the alkyl (meth)acrylate (A).

The monomer mixture a preferably contains none of the reactive (meth)acrylate (B), and for example the amount of the reactive (meth)acrylate (B) is typically less than 10 mass %, preferably not more than 5 mass %, and more preferably 1 mass % or less.

In the monomer mixture a, the amount of the monomer (C) other than the monomers (A) and (B) is preferably not more than 60 mass %, and is more preferably from 10 to 40 mass %.

The amount of the reactive (meth)acrylate (B) in the above monomer mixture b is preferably at least 10 mass %, more preferably 15 to 50 mass %, and even more preferably 20 to 40 mass %.

From the viewpoints of affinity with the solvent used and regulation of the molecular weight, the monomer mixture b preferably also contains the monomer (A). The amount of the monomer (A) in the monomer mixture b is preferably from 5 to 80 mass %, and more preferably from 10 to 50 mass %.

In the monomer mixture b, an alkyl (meth)acrylate having a carbon number of less than 12 can be included favorably as the monomer (C) other than the monomers (A) and (B), and in such cases, the amount of this monomer (C) is preferably not more than 60 mass %, and is more preferably from 10 to 40 mass %.

One example of the amine-modified (meth)acrylic block polymer is an A-B block copolymer in which a block A comprising mainly units based on the monomer (A) and a block B comprising mainly units based on the monomer (B) are bonded together in an A-B configuration.

Furthermore, from the viewpoints of the solubility between the dispersant and the solvent, and the adsorption to the pigment, the block polymer dispersant may also be an A-AB block copolymer in which a block A comprising mainly units based on the monomer (A) and a block AB having both units based on the monomer (B) and units based on the monomer (A) are bonded together in an A-AB configuration, or an A-B-A block copolymer in which a block A comprising mainly units based on the monomer (A) and a block B comprising mainly units based on the monomer (B) are bonded together in an A-B-A configuration. The number of linked blocks is not limited to the above configurations.

From the viewpoint of the solubility in non-aqueous solvents, and particularly non-polar solvents, an A-AB block copolymer or an A-B-A block copolymer is preferable.

In one example of a method of synthesizing the amine-modified (meth)acrylic block polymer, in a first stage, one of the monomer mixture a containing the monomer (A) and the monomer mixture b containing the monomer (B) is polymerized to obtain a first block, in a second stage, the other monomer mixture is polymerized in the presence of this first block, thereby linking a block of the other monomer mixture to the terminal of the first block and yielding a polymerized (meth)acrylic block polymer, and in a subsequent third stage, diethanolamine is reacted with this (meth)acrylic block polymer to obtain the amine-modified (meth)acrylic block polymer.

Below is a description of a method of synthesizing the block (meth)acrylic block polymer in which the monomer mixture a containing the monomer (A) is polymerized in the first stage to obtain a block A, and the monomer mixture b containing the monomer (B) is added in the second stage, thereby polymerizing a block B from the terminal of the block A to synthesize the (meth)acrylic block polymer. Depending on the variety of the monomers used, it may also be possible to polymerize the block B first, and then polymerize the block A.

First, in the first stage, the monomer mixture a may also include, in addition to the monomer (A), an optional monomer (C) other than the monomers (A) and (B), provided inclusion of the monomer (C) does not impair the effects of the present invention. The compounds mentioned above can be used as the monomer (C). Of the various possibilities for the monomer (C), the use of an alkyl (meth)acrylate having a carbon number of less than 12 is preferable.

This monomer mixture a can be polymerized by conventional radical polymerization. The reaction is preferably conducted as either a solution polymerization or a dispersion polymerization. If necessary, the polymerization reaction can be accelerated by performing the polymerization reaction under heat. The heating temperature is typically controlled appropriately within a range from 40 to 130° C., and preferably from 80 to 130° C.

Examples of polymerization initiators that may be used include conventional thermal polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation). Alternatively, a photopolymerization initiator may be used in which irradiation with an active energy beam is used to generate radicals.

In order to ensure that the molecular weight of the (meth)acrylic block polymer following polymerization satisfies the preferred range described below, a chain transfer agent may also be used during the polymerization. Examples of compounds that can be used as this chain transfer agent include thiols such as n-butyl mercaptan, lauryl mercaptan, stearyl mercaptan and cyclohexyl mercaptan.

During the polymerization reaction, other typically employed polymerization inhibitors, polymerization accelerators and dispersants and the like may also be added to the reaction system.

In the present embodiment, in the second stage, the (meth)acrylic block polymer is preferably polymerized by a living polymerization method, which is a type of precision polymerization. In the example described above, by performing a living polymerization of the monomer mixture b containing the monomer (B) together with the synthesized block A, a block polymer can be produced. The block B may also be polymerized first, and the monomer mixture a containing the monomer (A) then subjected to living polymerization.

In order to obtain the (meth)acrylic block polymer, in the present embodiment, a living radical polymerization is preferably used as the living polymerization method. Examples of known living radical polymerization methods include atom transfer radical polymerization (ATRP), nitroxide radical-mediated living radical polymerization (NMP) and reverse addition fragmentation chain transfer polymerization (RAFT polymerization), and although any of these methods may be used, performing the polymerization by RAFT polymerization is particularly desirable.

RAFT polymerization is characterized by the use of a reverse addition fragmentation chain transfer agent (hereafter referred to as a "RAFT agent") as a polymerization initiator, and is a method that enables living characteristics to be achieved in a radical polymerization. Examples of compounds that can be used as the RAFT agent include thiocarbonylthio compounds such as dithioesters, dithiocarbamates, trithiocarbonates and xanthates. Examples of commercially available products that can be used favorably include 4-cyano-4-(phenylcarbonothioylthio)pentanoic acid (722995, manufactured by Sigma-Aldrich Co. LLC.) and 2-cyano-2-propyl dodecyl trithiocarbonate (723037, manufactured by Sigma-Aldrich Co. LLC.).

Next, in the third stage, the amine-modified (meth)acrylic block polymer can be synthesized by introducing amino groups into the obtained (meth)acrylic block polymer by reacting the functional group that can react with an amino group with an amino alcohol. At this time, in order to accelerate the reaction with the amino alcohol, the reaction may be performed under heating at a temperature within a range from 70 to 120° C.

Although there are no particular limitations on the molecular weight (weight-average molecular weight) of the amine-modified (meth)acrylic block polymer, if the resulting dispersion is to be used as an inkjet ink, then from the viewpoint of ink dischargeability, the molecular weight is preferably about 10,000 to 100,000, and more preferably about 10,000 to 80,000. Moreover, in the case of the dispersant of the present embodiment, superior dispersion stability can be achieved when the molecular weight is about 20,000 to 50,000.

The molecular weight of this amine-modified (meth)acrylic block polymer is substantially the same as the molecular weight of the (meth)acrylic block polymer prior to reaction with the amino alcohol, and therefore by adjusting the molecular weight in the polymerization process for the (meth)acrylic block polymer, an amine-modified (meth)acrylic block polymer having a molecular weight within the desired range can be obtained.

Within the amine-modified (meth)acrylic block polymer, the weight-average molecular weight of the block A portion polymerized from the monomer mixture a containing the monomer (A) is preferably about 5,000 to 40,000, and more preferably about 8,000 to 30,000. This ensures that the solvent affinity of the block A portion falls within a more suitable range.

Another example of the (meth)acrylic block polymer having basic groups is a block copolymer having a block A of a monomer mixture a containing an alkyl (meth)acrylate (A) having an alkyl group with a carbon number of 12 or greater, and a block B of a monomer mixture b containing a reactive (meth)acrylate (B) having an amino group.

In this example, (meth)acrylates having a tertiary amino group can be used favorably as the (meth)acrylate (B) having an amino group. Specifically, dimethylaminoethyl (meth)acrylate, diethylaminoethyl (meth)acrylate, dimethylaminopropyl methacrylamide, or dipropylaminoethyl (meth) acrylamide or the like may be used individually, or in combinations containing a plurality of these compounds.

This (meth)acrylic block polymer having basic groups can be obtained by a method in which, in a first stage, one of the monomer mixture a containing the monomer (A) and the monomer mixture b containing the monomer (B) having an amino group is polymerized to obtain a first block, and in a second stage, the other monomer mixture is polymerized in the presence of this first block, thereby linking a block of the other monomer mixture to the terminal of the first block.

From the viewpoints of the stability of the emulsion and the dispersibility of the colored resin particles, the amount of the basic dispersant within the continuous phase is preferably from 0.1 to 15 mass %, and more preferably from 1 to 10 mass %, relative to the total mass of the continuous phase.

From the viewpoint of the dispersibility of the colored resin particles, the amount of the basic dispersant following removal of the solvent B is preferably from 0.1 to 20 mass %, and more preferably from 1 to 15 mass %, relative to the total mass of the colored resin particle dispersion.

Other optional components such as antioxidants, surface tension regulators and antifoaming agents may be added to the continuous phase, provided they do not impair the effects of the present invention.

—Dispersed Phase

The dispersed phase contains the solvent B, the colorant, and the esterified solid resin. Further, when the colorant is a pigment, the dispersed phase may also contain a pigment dispersant.

The solubility of the solvent B in the aforementioned solvent A at 23° C. is preferably not more than 3 g/100 g, and the boiling point of the solvent B is preferably lower than that of the solvent A.

The solvent B is preferably a polar organic solvent, and is more preferably a lower alcohol-based solvent. Examples of this lower alcohol-based solvent include isopropyl alcohol, ethylene glycol, ethanol, methanol, propanol and butanol. Lower alcohol-based solvents having a carbon number of 4 or less are particularly preferable.

Other specific examples of the solvent B include acetone, methyl ethyl ketone, and ethyl acetate and the like. Moreover, the solvent B may be selected appropriately so as to satisfy specific relationships with the aforementioned solvent A, the basic dispersant and the resin.

These solvents may be used individually, or a plurality of solvents may be combined.

The solubility of the solvent B in the solvent A at 23° C. is preferably not more than 3 g/100 g, and is more preferably 1 g/100 g or less, and even more preferably 0.5 g/100 g or less. It is even more preferable that the solvent B is essentially insoluble in the solvent A.

The difference in the boiling points of the solvent B and the solvent A is preferably at least 10° C., more preferably 20° C. or greater, and even more preferably 50° C. or greater. In the case of a mixed solvent such as a petroleum-based hydrocarbon solvent, the 50% distillation point is used as the boiling point. Further, the boiling point of the solvent B is preferably not higher than 100° C., and is more preferably 90° C. or lower. On the other hand, there are no particular limitations on the lower limit for the boiling point of the solvent B, provided the solvent B is liquid within a range from −20 to 90° C.

The solvent B preferably has a Hansen solubility parameter (HSP value) of 18 to 30 MPa/cm$^3$, and more preferably 20 to 30 MPa/cm$^3$. Further, the solvent B preferably has a dispersion parameter δd of 14 to 17, a polar parameter δp of 5 to 15, and a hydrogen bonding parameter δh of 5 to 25, and more preferably has a dispersion parameter δd of 14 to 17, a polar parameter δp of 5 to 15, and a hydrogen bonding parameter δh of 15 to 25.

By ensuring that the solubility parameters of the solvent B satisfy the above ranges, the solubility in the solvent A can be kept low, and the solvent can be provided with the ability to dissolve both the colored resin particles and the solid resin. Provided the solubility parameters of the colored resin particles and the solid resin satisfy the ranges described above, they will dissolve in the solvent B but be insoluble in the solvent A, meaning good dispersion stability can be obtained.

Further, it is preferable that the solvent A is a hydrocarbon-based solvent, and the solvent B is an alcohol-based solvent having a carbon number of 4 or less. Preferred examples of the hydrocarbon-based solvent include naphthene, paraffin, and isoparaffin and the like, whereas preferred examples of the alcohol-based solvent having a carbon number of 4 or less include methanol, ethanol, propanol and butanol, with methanol being particularly preferable.

The colorant may be a dye or a pigment, or a combination thereof.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The average particle size of the pigment is preferably 300 nm or less, and more preferably 200 nm or less. This ensures that the dispersibility of the pigment within the dispersed phase can be maintained favorably, and also ensures that the particle size of the final colored resin particles is appropriate.

When a pigment is used for the colorant, solid chips having the pigment already dispersed in the aforementioned esterified solid resin can be used. In such a case, the affinity between the pigment and the esterified solid resin is improved, and the fixability can be further enhanced. Further, such solid chips are also advantageous from the viewpoint of ink production. Examples of methods that can be used for dispersing the pigment in the esterified solid resin include a method using a twin roll mill or the like.

Examples of commercially available solid chips that can be used include those listed below. All of the following products are manufactured by Taihei Chemicals Limited, and use nitrocellulose (NC) as the esterified solid resin.

"NCL1/4 Mogul L": carbon black (45%)/NCL1/4 (45%)/ATBC (10%)

"NCL1/8 Yellow FGS": pigment yellow 74 (50%)/NCL1/8 (35%)/ATBC (15%)

"NCL1/4 Blue B4G": phthalocyanine blue (40%)/NCL1/4 (45%)/ATBC (15%)

(all manufactured by Taihei Chemicals Limited)

NCL1/4 and NCL1/8 are nitrocellulose, and ATBC is acetyl tributyl citrate. The above % values are mass % values.

When a pigment is used for the colorant, in order to ensure stable dispersion of the pigment within the dispersed phase, namely within the solvent B, a pigment dispersant may be included in the dispersed phase.

An anionic dispersant, cationic dispersant or nonionic dispersant may be used as the pigment dispersant, and the dispersant may be selected appropriately in accordance with the other components of the emulsion. Further, the pigment dispersant may use a high-molecular weight compound or a low molecular weight compound (surfactant).

Examples of the pigment dispersant include hydroxyl group-containing carboxylate esters, salts of high-molecular weight polycarboxylic acids, naphthalenesulfonic acid formalin condensate salts, polyoxyethylene alkyl phosphate esters, salts of long-chain polyaminoamides and high-molecular weight acid esters, salts of long-chain polyaminoamides and polar acid esters, polyester polyamines, stearylamine acetate, high-molecular weight unsaturated acid esters, polyoxyethylene nonylphenyl ethers, high-molecular weight copolymers, modified polyurethanes, and modified polyacrylates and the like.

These dispersants may be used individually, or a plurality of dispersants may be combined.

The pigment dispersant preferably has a higher solubility in the solvent B than in the solvent A, and for example the solubility in the solvent B at 23° C. is preferably at least 3 g/100 g, and more preferably 5 g/100 g or greater. It is even more preferable that the pigment dispersant is selected so that, in the blend proportions used in the oil-in-oil emulsion, the pigment dispersant dissolves essentially completely in the solvent B, and undergoes essentially no dissolution in the solvent A.

Examples of the anionic dispersant include phosphate ester compounds, including polyoxyalkyl phosphate esters such as polyoxyethylene alkyl phosphate esters and polyoxyethylene polyoxypropylene phosphate esters, and polyether polyester phosphate esters; alkyl polyphosphonic acids; carboxyl group-containing (meth)acrylic polymers; and low molecular weight compounds such as phosphate esters, sulfate esters, and 1-hydroxyethane-1,1-diphosphonic acid.

These dispersants may be used individually, or a plurality of dispersants may be combined.

Examples of commercially available products that can be used as the anionic dispersant include "DISPERBYK 102, 108, 110, 111, 180" (all product names) manufactured by BYK-Chemie Japan K.K., "TEGO Dispers 655" manufactured by Tomoe Engineering Co., Ltd., and "Efka 6230" manufactured by Efka Chemicals B.V. All of these products exhibit good solubility in the solvent B.

For the cationic dispersant, nitrogen-containing compounds having an amino group, amide group, pyridyl group, or urethane linkage or the like can be used favorably, and among such compounds, nitrogen-containing compounds having an amino group are preferable.

Examples of commercially available products that can be used as the cationic dispersant include "Solsperse 71000" manufactured by The Lubrizol Corporation, and "DISPER-BYK 2155 and 9077" manufactured by BYK-Chemie Japan K.K. All of these products exhibit good solubility in the solvent B.

When a cationic dispersant is used as the pigment dispersant, the base value of the cationic dispersant is preferably at least 1 mgKOH/g, more preferably 10 mgKOH/g or greater, and even more preferably 20 mgKOH/g or greater. This enhances the affinity with the pigment, and can improve the dispersion performance.

The blend amount of the pigment dispersant within the dispersed phase can be set as appropriate, but from the viewpoint of the pigment dispersibility, the mass ratio relative to 1 part of the pigment is preferably about 0.05 to 2.0 parts, more preferably from 0.1 to 1.0 parts, and even more preferably from 0.2 to 0.6 parts.

Any of the dyes typically used in this technical field can be used as the dye, and examples include basic dyes, acid dyes, salt-forming dyes, direct dyes, soluble vat dyes, acid mordant dyes, mordant dyes, reactive dyes, vat dyes, sulfide dyes, and metal complex dyes. These dyes may be used individually, or a plurality of dyes may be combined.

Specific examples of the dyes include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine-based dyes, metal phthalocyanine-based dyes, triarylmethane dyes, rhodamine dyes, sulforhodamine dyes, methine dyes, azomethine dyes, quinone dyes, triphenylmethane dyes, diphenylmethane dyes, and methylene blue and the like. These dyes may be used individually, or a plurality of dyes may be combined.

In a preferred configuration, by ensuring that the dye has a higher solubility in the solvent B than in the solvent A, the dye and the resin can be dissolved in the solvent B in the dispersed phase, enabling a stable colored resin particle dispersion to be provided.

The solubility of the dye in the solvent A at 23° C. is preferably not more than 0.5 g/100 g, and more preferably 0.1 g/100 g or less. Further, the solubility of the dye in the solvent B at 23° C. is preferably at least 0.5 g/100 g, and more preferably 1 g/100 g or greater. It is even more preferable that the dye is selected so that, in the blend proportions used in the oil-in-oil emulsion, the dye dissolves essentially completely in the solvent B, and undergoes essentially no dissolution in the solvent A.

Further, from the viewpoint of the water resistance of the colored resin particles, the dye is preferably an oil-soluble dye. Further, by using an acid dye, the basic dispersant is incorporated in the continuous phase and the acidic acid dye is incorporated in the dispersed phase, and therefore the oil-in-oil dispersion can be better stabilized. A metal complex dye is particularly preferable.

Examples of these types of oil-soluble dyes include OIL Blue 613, OIL, Yellow 107, and Spilit Black AB and ROB-B from the "OIL Color series" manufactured by Orient Chemical Industries Co., Ltd.

Specific examples of metal complex dyes that can be used include the "VALIFAST Color series" manufactured by Orient Chemical Industries Co., Ltd., including Valifast Black 3804, 3810 (solvent black 29), 3820, 3830, 3840 (solvent black 27) and 3870, Valifast Blue 1605, 2606, 2620 and 2670, Valifast Orange 3209 and 3210, Valifast Pink 2310N and 2312, Valifast Red 3304, 3311, 3312 and 3320, and Valifast Yellow 3108, 3170, 4120 and 4121;

the "Orasol series" manufactured by BASF Corporation, including Orasol Black RL1, Blue GN, Pink 5BLG and Yellow 2RLN; and the "Aizen Spilon series" manufactured by Hodogaya Chemical Co., Ltd., including Aizen Spilon Black BH and RLH, Aizen Spilon Violet RH, Aizen Spilon Red CBH and BEH, Aizen Spilon Yellow GRH, Aizen SPT Blue 26, Aizen SPT Blue 121, and Aizen SPN Yellow 510.

The amount of the colorant in the dispersed phase, reported as a combined amount of the pigments and dyes relative to the total mass of the dispersed phase, is preferably from 0.1 to 50 mass %, more preferably from 1 to 40 mass %, and even more preferably from 2 to 20 mass %. This enables the solubility or dispersibility of the colorant in the solvent B to be stabilized.

Following removal of the solvent B, the amount of the colorant, reported as a combined amount of the pigments and dyes relative to the total mass of the colored resin particle dispersion, is preferably from 0.1 to 50 mass %, more preferably from 1 to 40 mass %, and even more preferably from 2 to 20 mass %. This ensures that the coloring of the colored resin particles is appropriate, and that the shape of the particles can be stabilized.

The esterified solid resin is a phosphorylated solid resin and/or a nitrated solid resin which has a solubility in the non-aqueous solvent at 23° C. of 3 g/100 g or less. Details are as described above.

When the colored resin particles are produced via an oil-in-oil emulsion, it is preferable that this esterified solid resin has a higher solubility in the solvent B than in the solvent A.

The solubility of the solid resin in the solvent B at 23° C. is preferably at least 10 g/100 g, and more preferably 20 g/100 g or greater. Further, the solubility of the solid resin in the solvent A at 23° C. is preferably not more than 3 g/100 g, and more preferably 0.5 g/100 g or less. It is even more preferable that, in the blend proportions used in the oil-in-oil emulsion, the resin dissolves essentially completely in the solvent B, and undergoes essentially no dissolution in the solvent A.

The amount of the esterified solid resin relative to the total mass of the dispersed phase is preferably from 0.1 to 50 mass %, more preferably from 1 to 40 mass %, and even more preferably from 2 to 20 mass %. This enables appropriate solubility of the solid resin within the solvent B, and enables a more even distribution of the components of the colored resin particles.

The amount of the esterified solid resin relative to the total mass of the colored resin particle dispersion following removal of the solvent B is preferably from 0.1 to 20 mass %, and more preferably from 1 to 15 mass %. This ensures that the coloring of the colored resin particles is appropriate, and that the shape of the particles can be stabilized.

The mass ratio between the esterified solid resin and the colorant preferably satisfies (mass of esterified solid resin)/(mass of colorant)≥0.5. When this range is satisfied, mixing and stirring of the continuous phase and the dispersed phase is able to provide an oil-in-oil emulsion having excellent emulsion stability.

The dispersed phase may further contain a liquid organic compound (plasticizer). Details relating to the liquid organic compound are as described above.

Including the liquid organic compound enables the solubility to be further enhanced when the aforementioned esterified solid resin and colorant are mixed with the solvent B. Accordingly, the dispersed phase can be dispersed more stably within the continuous phase in the oil-in-oil emulsion. As a result, the components of the colored resin particles can be dispersed more uniformly, and effects such as the improvement in the abrasion resistance of the printed items can be further enhanced.

The solubility of the liquid organic compound in the solvent B at 23° C. is preferably at least 3 g/100 g, more preferably 10 g/100 g or greater, and even more preferably 20 g/100 g or greater. Further, the solubility of the liquid organic compound in the solvent A at 23° C. is preferably not more than 3 g/100 g, more preferably 1 g/100 g or less, and even more preferably 0.5 g/100 g or less. It is even more preferable that, in the blend proportions used in the oil-in-oil emulsion, the liquid organic compound dissolves essentially completely in the solvent B, and undergoes essentially no dissolution in the solvent A.

The amount of the liquid organic compound in the dispersed phase, relative to the total mass of the dispersed phase, is preferably from 1 mass % to 20 mass %.

The amount of the liquid organic compound following removal of the solvent B, relative to the total mass of the colored resin particle dispersion, is preferably from 5 mass % to 40 mass %.

Other optional components such as antifoaming agents, antioxidants, surface tension regulators and crosslinking agents may be added to the dispersed phase, provided they do not impair the effects of the present invention.

—Method of Preparing Dispersion

The method used for preparing the colored resin particle dispersion is not particularly limited, and the dispersion can be prepared by dispersing the dispersed phase described above in the continuous phase described above to prepare an oil-in-oil emulsion, and then removing the non-aqueous solvent B from the dispersed phase of the oil-in-oil emulsion.

For example, the continuous phase and the dispersed phase can be prepared by mixing the various components described above. Subsequently, the dispersed phase can be dispersed in the continuous phase by mixing and stirring the two phases while the dispersed phase is added dropwise to the continuous phase. At this time, the mixing and stirring can be performed using an ultrasonic homogenizer. The non-aqueous solvent B is then removed from the obtained oil-in-oil emulsion under reduced pressure and/or heating. At this time, the degree of pressure reduction and/or heating is adjusted so that the non-aqueous solvent B is removed but the non-aqueous solvent A is retained.

When a pigment is used as the colorant, examples of the method used for dispersing the pigment in the dispersed phase include methods using typical wet dispersion devices such as a ball mill, beads mill, ultrasound, homomixer or high-pressure homogenizer.

Further, the mass ratio between the continuous phase and the dispersed phase in the oil-in-oil emulsion can be adjusted within a range from 40:60 to 95:5. The amount added of the non-aqueous solvent B is preferably from 5 to 40 mass %, and more preferably from 5 to 30 mass %, relative to the total mass of the oil-in-oil emulsion. Further, the amount removed of the non-aqueous solvent B is preferably the total amount added of the non-aqueous solvent B, but any amount that is 90 mass % or more of the total amount added of the non-aqueous solvent B is acceptable.

Another example of the method used for producing the colored resin particle dispersion is a method in which the components of the dispersed phase are prepared independently as a plurality of mixed liquids, and these mixed liquids are then added dropwise, either simultaneously or sequentially, to the continuous phase to prepare the oil-in-oil emulsion.

Specifically, a method can be used in which a phase containing at least the basic dispersant and a non-aqueous solvent (the solvent A) is used as the continuous phase, a phase which does not contain the colorant or the esterified solid resin, but contains at least a non-aqueous solvent (the solvent B) is used as the dispersed phase, the continuous phase and the dispersed phase are mixed together to prepare an oil-in-oil (O/O) pre-emulsion, a mixed liquid containing the colorant, the esterified solid resin and a non-aqueous solvent (the solvent B) is then added to this pre-emulsion to prepare an oil-in-oil (O/O) emulsion, and the solvent B from the dispersed phase and the added solvent B from the mixed liquid is then removed under reduced pressure and/or heating to obtain the colored resin particle dispersion. In the following description, this method is sometimes referred to as a two-stage emulsification method.

In order to ensure stable preparation of the oil-in-oil emulsion, the solvent B preferably exhibits low solubility in the solvent A. Further, in order to enable removal of the solvent B, the solvent B preferably has a lower boiling point than that of the solvent A.

In order to ensure stable preparation of the oil-in-oil emulsion, the basic dispersant preferably has a higher solubility in the solvent A than in the solvent B. Further, in order to stabilize the shape of the colored resin particles, the esterified solid resin preferably has a higher solubility in the solvent B than in the solvent A.

In the two-stage emulsification method, aggregation of the colorant can be prevented in the process of preparing the colored resin particles, enabling finer colored resin particles to be provided. In the process for preparing the colored resin particles, the colorant may sometimes interact and aggregate with other components, but in this two-stage emulsification method, because the colorant is added afterward as an individual component, this type of aggregation can be prevented.

Colored resin particles of fine particle size are particularly suited to inkjet inks.

In the two-stage emulsification method, unless specifically mentioned otherwise, the various components used in the oil-in-oil emulsion are the same as those described above. The aggregation problem can be remedied regardless of whether the colorant is a pigment or a dye.

In the continuous phase, the blend amounts of the basic dispersant and the solvent A are the same as those used in the one-stage emulsification method described above.

The amount of the colorant in the mixed liquid, relative to the total mass of the mixed liquid, is preferably from 5 to 40 mass %, and more preferably from 10 to 30 mass %. When the colorant is a pigment, a pigment dispersant may also be added to the mixed liquid.

The amount of the esterified solid resin in the mixed liquid, relative to the total mass of the mixed liquid, is preferably from 5 to 40 mass %, and more preferably from 10 to 30 mass %.

In the colored resin particle dispersion obtained by the two-step emulsification method, each of the components is preferably included in a prescribed proportion, in the same manner as described above for the one-step emulsification method.

In the colored resin particle dispersion, the average particle size of the colored resin particles is preferably the same as described above.

The average particle size of the colored resin particles can be controlled by adjusting the amount of the basic dispersant added to the continuous phase, or the amount of the non-volatile fraction included in the dispersed phase or the like. By using the esterified solid resin, the average particle size of the colored resin particles can be kept to a smaller size.

(Ink)

The ink according to the present embodiment is an ink containing the colored resin particle dispersion described above. This ink can be used as a general-purpose printing ink for inkjet printing, offset printing, stencil printing, gravure printing, or electrophotographic printing or the like. Because the ink has good dispersion stability, use of the ink as an inkjet ink is particularly preferable.

When used as an inkjet ink, the colored resin particle dispersion can be used as is, but if required, may include any of the various additives typically used in the field, provided these additives do not impair the objects of the present invention. For example, nozzle blockage prevention agents, antioxidants, conductivity modifiers, viscosity modifiers, surface tension regulators, and oxygen absorbers and the like may be added as appropriate. There are no particular limitations on the types of these additives, and any additives used in the field can be used. Further, the colored resin particle dispersion may be diluted with a non-aqueous solvent described above.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s. In this description, the viscosity describes a value measured at 23° C. by raising the shear stress from 0 Pa at a rate of 0.1 Pa/s, and refers to the measured value at 10 Pa.

There are no particular limitations on the printing method using the inkjet ink, and any of various printing systems, including a piezo system, electrostatic system or thermal system may be used. In those cases where an inkjet recording device is used, the ink of the present embodiment is preferably discharged from the inkjet head based on a digital signal, with the discharged ink droplets being adhered to the recording medium.

In the present embodiment, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have minimal gaps on the paper surface compared with plain papers and coated papers designed for inkjets, and therefore penetration of the ink is slow, and the ink components are more readily retained on the surface of the paper. As a result, the ink according to the present embodiment is suitable for improving the fixability to coated printing papers.

The present invention can provide a colored resin particle dispersion and an ink which exhibit excellent color development and abrasion resistance. Moreover, the invention also provides a colored resin particle dispersion and an inkjet ink which exhibit excellent color development and abrasion resistance, together with excellent water resistance and marker resistance.

EXAMPLES

The present invention is described below in further detail using a series of examples, but the present invention is in no way limited by these examples. Unless specifically state otherwise, "%" refers to "mass %".

<Ink Preparation>

Formulations of oil-in-oil emulsions for a series of examples and comparative examples prior to removal of the solvent B are shown in Table 2 and Table 3. In Table 2 and Table 3, when a dispersant includes a volatile component, the total amount of the dispersant is shown, and the non-volatile fraction amount is also shown in parentheses (this also applies in Table 4 and Table 5 below).

The continuous phase was prepared by mixing the solvent A and the basic dispersant in the blend amounts shown in Table 2 or Table 3. Subsequently, the dispersed phase was prepared by mixing the colorant and each resin with the solvent B in the blend amounts shown in Table 2 or Table 3, and then dispersing the resulting mixture using a beads mill. In Examples 5 to 8, and Comparative Examples 5 to 8, a liquid polyester polyol or a liquid polyether polyol was also added to the dispersed phase.

With the continuous phase in a state of continuous stirring with a magnetic stirrer under ice cooling, a 10 minute irradiation with an ultrasonic homogenizer (Ultrasonic Processor VC-750, manufactured by Sonics & Materials, Inc.) was conducted while the premixed dispersed phase was added dropwise to the continuous phase, thus obtaining an oil-in-oil (O/O) emulsion.

The solvent B within the dispersed phase was removed from the obtained emulsion under reduced pressure using an evaporator, thus obtaining a colored resin particle dispersion. The rate of removal of the solvent B was essentially 100 mass %. This colored resin particle dispersion was used as an ink with no further modification.

Formulations of inks of the examples and comparative examples following removal of the solvent B are shown in Table 4 and Table 5. The amount of the non-volatile fraction was determined from the combined total of the amount of each of the non-volatile components (the basic dispersant, the colorant, each resin, the polyester polyol and the polyether polyol) relative to the total mass of the ink, and this amount of the non-volatile fraction is also shown in Table 4 and Table 5.

TABLE 2

Formulations of oil-in-oil emulsions of Examples (prior to solvent B removal)

| | | Units: mass % | Example 1 | 2 | 3 | 4 | 5 | 6 | 7 | 8 |
|---|---|---|---|---|---|---|---|---|---|---|
| Continuous phase | Solvent A | Isopar M | 61.0 | 58.0 | 58.5 | 61.0 | 55.5 | 58.0 | 55.5 | 55.5 |
| | Dispersant | Basic dispersant 1 | 10.0 | 10.0 | | 10.0 | | 10.0 | | |
| | | (non-volatile fraction 50%) | (5.0) | (5.0) | | (5.0) | | (5.0) | | |
| | | Basic dispersant 2 | | | 12.5 | | 12.5 | | 12.5 | 12.5 |
| | | (non-volatile fraction 40%) | | | (5.0) | | (5.0) | | (5.0) | (5.0) |
| Dispersed phase | Solvent B | Methanol | 20.0 | 20.0 | 20.0 | 20.0 | 20.0 | 20.0 | 21.0 | 21.0 |
| | Dye | Black metal complex dye | 4.0 | 4.0 | 4.0 | 4.0 | 4.0 | 4.0 | | |
| | Pigment | Black pigment "PBk7" | | | | | | | 3.0 | 3.0 |
| | Solid resin | Phosphorylated polyvinyl alcohol | 5.0 | 8.0 | | | | | | 5.0 |
| | | Phosphorylated polyvinyl acetal | | | 5.0 | | 5.0 | | | |
| | | Nitrocellulose | | | | 5.0 | | 5.0 | 5.0 | |
| | Polyester polyol | | | | | | 3.0 | | 3.0 | |
| | Polyether polyol | | | | | | | 3.0 | | 3.0 |
| Total (mass %) | | | 100.0 | 100.0 | 100.0 | 100.0 | 100.0 | 100.0 | 100.0 | 100.0 |

TABLE 3

Formulations of oil-in-oil emulsions of Comparative Examples (prior to solvent B removal)

| | | Units: mass % | Comparative Example 1 | 2 | 3 | 4 | 5 | 6 | 7 | 8 | 9 |
|---|---|---|---|---|---|---|---|---|---|---|---|
| Continuous phase | Solvent A | Isopar M | 61.0 | 58.0 | 58.5 | 61.0 | 55.5 | 58.0 | 55.5 | 55.5 | 61.0 |
| | Dispersant | Basic dispersant 1 | 10.0 | 10.0 | | 10.0 | | 10.0 | | | 10.0 |
| | | (non-volatile fraction 50%) | (5.0) | (5.0) | | (5.0) | | (5.0) | | | (5.0) |
| | | Basic dispersant 2 | | | 12.5 | | 12.5 | | 12.5 | 12.5 | |
| | | (non-volatile fraction 40%) | | | (5.0) | | (5.0) | | (5.0) | (5.0) | |
| Dispersed phase | Solvent B | Methanol | 20.0 | 20.0 | 20.0 | 20.0 | 20.0 | 20.0 | 21.0 | 21.0 | 20.0 |
| | Dye | Black metal complex dye | 4.0 | 4.0 | 4.0 | 4.0 | 4.0 | 4.0 | | | 4.0 |
| | Pigment | Black pigment "PBk7" | | | | | | | 3.0 | 3.0 | |
| | Solid resin | Polyvinyl alcohol | 5.0 | 8.0 | | | | | | 5.0 | |
| | | Polyvinyl acetal | | | 5.0 | | 5.0 | | | | |
| | | Cellulose acetate butyrate | | | | 5.0 | | 5.0 | 5.0 | | |
| | | Styrene-maleic acid resin | | | | | | | | | 5.0 |
| | Polyester polyol | | | | | | 3.0 | | 3.0 | | |
| | Polyether polyol | | | | | | | 3.0 | | 3.0 | |
| Total (mass %) | | | 100.0 | 100.0 | 100.0 | 100.0 | 100.0 | 100.0 | 100.0 | 100.0 | 100.0 |

The components shown in each of the tables are described below.

(Continuous Phase)

Isopar M: an isoparaffin-based hydrocarbon-based solvent, manufactured by TonenGeneral Sekiyu K.K.

Basic dispersant 1: "Solsperse 11200" manufactured by Lubrizol Japan Ltd., non-volatile fraction 50%, base value 37 mgKOH/g.

Basic dispersant 2: an amine-modified methacrylic block polymer "AmPA1-B", non-volatile fraction 40%, base value 21 mgKOH/g.

(Dispersed Phase)

Methanol: an alcohol-based solvent having a carbon number of 1, manufactured by Wako Pure Chemical Industries, Ltd.

Black metal complex dye: "Valifast Black 3810" manufactured by Orient Chemical Industries Co., Ltd.

Black pigment "PBk7": Pigment Black 7, manufactured by Cabot Specialty Chemicals, Inc.

Phosphorylated polyvinyl alcohol: prepared in accordance with Production Example 1 described below.

Phosphorylated polyvinyl acetal: prepared in accordance with Production Example 2 described below.

Nitrocellulose: a nitrated solid resin, "DLT5-8" manufactured by Nobel NC Co., Ltd., degree of nitration 10.7 to 11.2, nitric acid modification rate 67 mol %.

Polyvinyl alcohol: (degree of saponification) 38 to 42 mol %, (polymerization degree) 200, "Kuraray LM Polymer LM-20", manufactured by Kuraray Co., Ltd.

Polyvinyl acetal: "S-LEC BL-10" (Mw) 15,000, manufactured by Sekisui Chemical Co., Ltd.

Cellulose acetate butyrate: "CAB553-0.4" manufactured by Eastman Chemical Company.

Styrene-maleic acid resin: "SMA 1440" (Mw) 7,000, manufactured by Kawahara Petrochemical Co., Ltd.

Polyester polyol: a liquid PG-PO/EO, "Adeka Polyether CM294" (Mw) 2,900, manufactured by Adeka Corporation.

Polyether polyol: a liquid AA/DEG, "Adeka Newace" (Mw) 1,000, manufactured by Adeka Corporation.

The above Mw values indicate the weight-average molecular weight.

The solubility of the methanol of the solvent B in the hydrocarbon-based solvent (Isopar M) of the solvent A at 23° C. is 0.4 g/100 g. Further, the boiling point of methanol is 64.7° C., and the 50% distillation point of Isopar M is 234° C.

The basic dispersant 1 and the basic dispersant 2 were dissolved in the solvent A in accordance with the continuous phase blend proportions shown in Table 2 and Table 3, whereas the solubility of both basic dispersants in the solvent B at 23° C. was less than 3 g/100 g.

The dye and the pigment were dissolved in the solvent B in accordance with the dispersed phase blend proportions shown in Table 2 and Table 3, whereas the solubility of both the dye and the pigment in the solvent A at 23° C. was less than 0.5 g/100 g.

The esterified solid resins were dissolved in the solvent B in accordance with the dispersed phase blend proportions shown in Table 2 and Table 3, whereas the solubility of the esterified solid resins in the solvent A at 23° C. was less than 3 g/100 g, and the solubility in water at 23° C. was less than 3 g/100 g.

The polyester polyol and the polyether polyol were dissolved in the solvent B in accordance with the dispersed phase blend proportions shown in Table 2 and Table 3, whereas the solubility of both the polyester polyol and the polyether polyol in the solvent A at 23° C. was less than 0.5 g/100 g.

The solubility parameter (HSP value) of each component is detailed below. The units are $MPa/cm^3$. Further, the dispersion parameter $\delta d$, the polar parameter $\delta p$, and the hydrogen bonding parameter $\delta h$ are also shown below.

Solvent A "Isopar M": 16 ($\delta d$=16, $\delta p$=0, $\delta h$=0).

Solvent B "Methanol": 29.6 ($\delta d$=15.1, $\delta p$=12.3, $\delta h$=22.3).

The various solid resins: within a range from 22 to 27 ($\delta d$=12 to 20, $\delta p$=5 to 12, $\delta h$=10 to 20).

The oxidation-reduction potential (ORP value) of each component is listed below. The units are mV.

Each of the basic dispersants: the ORP value when dissolved in dodecane at 5.0 mass % was lower than the ORP value when dissolved at 0.5 mass %, and the ORP value when dissolved in dodecane at 5.0 mass % was 0 or less.

<Phosphorylated Polyvinyl Alcohol Production Example>

A reaction container (internal volume 1 L) to which a reflux condenser, a powder introduction port and a thermometer had been connected was charged with 375 g of THF (tetrahydrofuran, this abbreviation is also used below), and 173 g of a vinyl acetate unit-containing polyvinyl alcohol ("Kuraray LM Polymer LM-20", manufactured by Kuraray Co., Ltd., degree of saponification: 38 to 42 mol %, polymerization degree: 200, Mw: 14,000, hydroxyl group equivalent weight: about 173) was added and dissolved.

With the contents of the reaction container undergoing constant stirring at a rate of 2,000 rpm using a magnetic stirrer, and with the reaction temperature held within a range from 30 to 58° C., 18 g of water and 71 g of $P_2O_5$ were each added to the reaction container in 6 equal portions at equal intervals over a period of 6 hours. The amount of $P_2O_5$ was adjusted to achieve a 1:1 ratio relative to the hydroxyl group equivalents within the vinyl acetate unit-containing polyvinyl alcohol.

Following addition of all of the water and the $P_2O_5$, the reaction was continued for 4 hours at a temperature of 30° C. and under stirring conditions of 2,000 rpm.

The solution containing the resulting phosphorylated product was filtered through a wire mesh to remove the small quantities of impurities such as gelled substances. Following filtering, an equal volume of n-hexane was added to the reaction product and stirred, and the precipitated viscous resin was collected by filtration. The filtrate was a cloudy solution of THF containing orthophosphoric acid, generated as a result of modification of the unreacted phosphoric anhydride. The resin was washed a further two times using equal amounts of n-hexane. The filtrate following the third washing was substantially transparent.

Residual n-hexane was removed from the final product by evaporation and drying, yielding the target phosphorylated polyvinyl alcohol.

<Phosphorylated Polyvinyl Acetal Production Example>

A reaction container (internal volume 1 L) to which a reflux condenser, a powder introduction port and a thermometer had been connected was charged with 458 g of THF, and 231 g of a polyvinyl acetal resin ("S-LEC BL-10" manufactured by Sekisui Chemical Co., Ltd., Mw: 15,000, hydroxyl group equivalent weight: about 231) was added and dissolved.

With the contents of the reaction container undergoing constant stirring at a rate of 2,000 rpm using a magnetic stirrer, and with the reaction temperature held within a range from 30 to 58° C., 18 g of water and 71 g of $P_2O_5$ were each added to the reaction container in 6 equal portions at equal intervals over a period of 6 hours. The amount of $P_2O_5$ was adjusted to achieve a 1:1 ratio relative to the hydroxyl group equivalents within the polyvinyl acetal resin.

Following addition of all of the water and the $P_2O_5$, the reaction was continued for 4 hours at a temperature of 30° C. and under stirring conditions of 2,000 rpm.

The solution containing the resulting phosphorylated product was filtered through a wire mesh to remove the small quantities of impurities such as gelled substances. Following filtering, an equal volume of n-hexane was added to the reaction product and stirred, and the precipitated viscous resin was collected by filtration. The filtrate was a cloudy solution of THF containing orthophosphoric acid, generated as a result of modification of the unreacted phosphoric anhydride. The resin was washed a further two times using equal amounts of n-hexane. The filtrate following the third washing was substantially transparent.

Residual n-hexane was removed from the final product by evaporation and drying, yielding the target phosphorylated polyvinyl acetal resin.

TABLE 4

Ink formulations of Examples (after solvent B removal) and evaluation results

| Units: mass % | | | Example 1 | Example 2 | Example 3 | Example 4 | Example 5 | Example 6 | Example 7 | Example 8 |
|---|---|---|---|---|---|---|---|---|---|---|
| Continuous phase | Solvent A | Isopar M | 76.25 | 72.50 | 73.13 | 76.25 | 69.38 | 72.50 | 70.25 | 70.25 |
| | Dispersant | Basic dispersant 1 (non-volatile fraction 50%) | 12.50 (6.25) | 12.50 (6.25) | | 12.50 (6.25) | | 12.50 (6.25) | | |

TABLE 4-continued

Ink formulations of Examples (after solvent B removal) and evaluation results

| | | Units: mass % | Example 1 | 2 | 3 | 4 | 5 | 6 | 7 | 8 |
|---|---|---|---|---|---|---|---|---|---|---|
| Dispersed phase | Solvent B | Basic dispersant 2 (non-volatile fraction 40%) | | | 15.63 (6.25) | | 15.63 (6.25) | | 15.82 (6.33) | 15.82 (6.33) |
| | | Methanol | 0.00 | 0.00 | 0.00 | 0.00 | 0.00 | 0.00 | 0.00 | 0.00 |
| | Dye | Black metal complex dye | 5.00 | 5.00 | 5.00 | 5.00 | 5.00 | 5.00 | | |
| | Pigment | Black pigment "PBk7" | | | | | | | 3.80 | 3.80 |
| | Solid resin | Phosphorylated polyvinyl alcohol | 6.25 | 10.00 | | | | | | 6.33 |
| | | Phosphorylated polyvinyl acetal | | | 6.25 | | 6.25 | | | |
| | | Nitrocellulose | | | | 6.25 | | 6.25 | 6.33 | |
| | Polyester polyol | | | | | | 3.75 | | 3.80 | |
| | Polyether polyol | | | | | | | 3.75 | | 3.80 |
| Total (mass %) | | | 100 | 100 | 100 | 100 | 100 | 100 | 100 | 100 |
| Amount of non-volatile fraction (mass %) | | | 17.5 | 21.3 | 17.5 | 17.5 | 21.3 | 21.3 | 20.3 | 20.3 |
| Evaluations | | Rub fastness | A | A | B | B | A | A | A | A |
| | | Water resistance | A | A | A | A | A | A | A | A |
| | | Marker resistance | A | A | A | A | A | A | A | A |
| | | Color development | A | A | A | A | A | A | A | A |
| | | Colored particles average particle size (nm) | 140 | 160 | 140 | 160 | 140 | 170 | 200 | 200 |

TABLE 5

Ink formulations of Comparative Examples (after solvent B removal) and evaluation results

| | | Units: mass % | Comparative Example 1 | 2 | 3 | 4 | 5 | 6 | 7 | 8 | 9 |
|---|---|---|---|---|---|---|---|---|---|---|---|
| Continuous phase | Solvent A | Isopar M | 76.25 | 72.50 | 73.13 | 76.25 | 69.38 | 72.50 | 70.25 | 70.25 | 76.25 |
| | Dispersant | Basic dispersant 1 (non-volatile fraction 50%) | 12.50 (6.25) | 12.50 (6.25) | | 12.50 (6.25) | | 12.50 (6.25) | | | 12.50 (6.25) |
| | | Basic dispersant 2 (non-volatile fraction 40%) | | | 15.63 (6.25) | | 15.63 (6.25) | | 15.82 (6.33) | 15.82 (6.33) | |
| Dispersed phase | Solvent B | Methanol | 0.00 | 0.00 | 0.00 | 0.00 | 0.00 | 0.00 | 0.00 | 0.00 | 0.00 |
| | Dye | Black metal complex dye | 5.00 | 5.00 | 5.00 | 5.00 | 5.00 | 5.00 | | | 5.00 |
| | Pigment | Black pigment "PBk7" | | | | | | | 3.80 | 3.80 | |
| | Solid resin | Polyvinyl alcohol | 6.25 | 10.00 | | | | | | 6.33 | |
| | | Polyvinyl acetal | | | 6.25 | | 6.25 | | | | |
| | | Cellulose acetate butyrate | | | | 6.25 | | 6.25 | 6.33 | | |
| | | Styrene-maleic acid resin | | | | | | | | | 6.25 |
| | Polyester polyol | | | | | | 3.75 | | 3.80 | | |
| | Polyether polyol | | | | | | | 3.75 | | 3.80 | |
| Total (mass %) | | | 100.0 | 100.0 | 100 | 100 | 100 | 100 | 100 | 100 | 100 |
| Amount of non-volatile fraction (mass %) | | | 16.3 | 20.0 | 17.5 | 16.3 | 21.3 | 20.0 | 20.3 | 20.3 | 16.3 |
| Evaluations | | Rub fastness | C | C | C | C | C | C | C | C | C |
| | | Water resistance | A | A | A | A | A | A | A | A | A |
| | | Marker resistance | C | C | C | C | C | C | C | C | C |
| | | Color development | C | C | C | C | C | C | C | C | C |
| | | Colored particles average particle size (nm) | 200 | >1000 | 200 | 200 | >1000 | >1000 | >1000 | >1000 | 400 |

<Evaluations>

Using each of the inks described above, each of the following evaluations was performed. The results are shown in Tables 4 and 5.

(Rub Fastness)

Each of the inks described above was mounted in a line-type inkjet printer "Orphis-X9050" (manufactured by Riso Kagaku Corporation), and a printed item was obtained by printing a solid image onto a high-quality coated paper "Aurora Coated Paper" (manufactured by Nippon Paper Industries Co., Ltd.). The printing was performed at a resolution of 300×300 dpi, under discharge conditions including an ink volume per dot of 42 pl. The "Orphis X9050" is a system that uses a line-type inkjet head, wherein the paper is transported in a sub-scanning direction perpendicular to the main scanning direction (the direction along which the nozzles are aligned) while printing is conducted.

Following standing for 24 hours after printing, the solid image portion of the printed item was rubbed strongly 5 times with a finger. The state of the printed item was then inspected visually, and the rub fastness was evaluated against the following criteria.

A: almost no separation of the image could be detected.

B: minor separation of the image was confirmed, but not problematic in actual use.

C: marked separation of the image occurred, at a level problematic for actual use.

(Water Resistance)

A printed item was obtained in the same manner as that described above for the rub fastness evaluation. Following standing for 24 hours after printing, 0.5 ml of water was dripped onto the solid image portion of the printed item, the level of bleeding was observed visually, and the water resistance was evaluated against the following criteria.

A: no bleeding of the printed image portion.

B: minor bleeding of the printed image portion, but not problematic in actual use.

C: bleeding of the printed image portion, at a level problematic for actual use.

(Marker Resistance)

With the exception of printing text instead of a solid image, a printed item was obtained in the same manner as that described above for the rub fastness evaluation. Following standing for 24 hours after printing, lines were drawn across the text of the printed portion on the coated paper using a line marker pen "PM-L103Y" manufactured by Kokuyo Co., Ltd. The state of the printed item was then inspected visually, and the marker resistance was evaluated against the following criteria.

A: no soiling of the printed image portion, or very minor soiling around the periphery of the printed image portion.

B: some soiling around the periphery of the printed image portion, but not problematic in actual use.

C: soiling around the periphery of the printed image portion, at a level problematic for actual use.

(Color Development)

A printed item was obtained in the same manner as that described above for the rub fastness evaluation. Following standing for 24 hours after printing, the density of the coating film was inspected visually, and the color development was evaluated against the following criteria.

A: the image was uniform, and satisfactory density was obtained.

B: the image was uniform, but the density was unsatisfactory.

C: the image was not uniform, and the density was unsatisfactory.

(Average Particle Size of Colored Resin Particles)

For each of the inks described above, the volume-based average particle size of the colored resin particles dispersed in the ink was measured using a dynamic light scattering particle size distribution analyzer "LB-500" (manufactured by Horiba, Ltd.).

As is evident from the tables shown above, the ink of each example exhibited favorable results for all the evaluations, and furthermore, the average particle size of the colored resin particles also fell within an appropriate range.

An esterified solid resin was used in each example, and favorable results were able to be obtained regardless of the type of dye or pigment used, and the type of basic dispersant used.

In Examples 5 to 8, a polyester polyol or polyether polyol was added to the dispersed phase, and favorable results were obtained.

In Examples 5 and 6, by adding the polyester polyol or polyether polyol to the dispersed phase, the rub fastness was able to be improved compared with Examples 3 and 4 in which no polyester polyol or polyether polyol was added.

In Comparative Examples 1 to 9, because neither a phosphorylated solid resin nor a nitrated solid resin was included, satisfactory results could not be obtained.

<Method of Producing Amine-Modified Methacrylic Block Polymer>

A method of producing the amine-modified methacrylic block polymer used as the basic dispersant 2 is described below.

(Step (1-1): First Stage, Preparation of Methacrylic Polymer (PA))

The formulation and physical properties of the methacrylic polymer used for preparing the basic dispersant are shown in Table 6.

In accordance with the formulation for the first stage shown in Table 6, a round-bottom flask was charged with dodecyl methacrylate, 2-cyano-2-propyl dodecyl trithiocarbonate (manufactured by Sigma-Aldrich Co. LLC.), AIBN (azobisisobutyronitrile, manufactured by Wako Pure Chemical Industries, Ltd.) and Isopar M (manufactured by Tonen-General Sekiyu K.K.). Following thorough deaeration, the atmosphere in the flask was replaced with an inert gas (argon), and the flask contents were stirred under heating at 90° C. for 24 hours. The solution of the thus obtained polymer PA1 had a non-volatile fraction of 40 mass %. The weight-average molecular weight of the polymer PA1 following the reaction was 11,000.

(Step (1-2): Second Stage, Preparation of Methacrylic Block Polymer (PA-(A)B))

The formulation and physical properties of the methacrylic block polymer are shown in Table 7.

Following the reaction for producing the polymer PA1, dodecyl methacrylate, glycidyl methacrylate, AIBN and Isopar M were added to the polymer PA1 in accordance with the formulation for the second stage shown in Table 7. Following deaeration and inert gas replacement in the same manner as described above, the flask contents were stirred under heating at 90° C. for 24 hours. The solution of the thus obtained polymer PA1-B had a non-volatile fraction of 40 mass %. The weight-average molecular weight of the polymer PA1-B following the reaction was 20,000. In the table, the blend amount of the polymer PA1 indicates the value for the entire solution.

In Table 7, the proportion of the monomer A in the methacrylic block polymer was determined from the molar ratio of the monomer A relative to the total amount of all the blended monomers. The proportion of the monomer B in the methacrylic block polymer was determined from the molar ratio of the monomer B relative to the total amount of all the blended monomers.

The block A:block B molar ratio was determined from the ratio between the total number of moles of monomer used in the first stage and the total number of moles of monomer used in the second stage.

The proportion of the monomer A in the block A is the ratio of the number of moles of the monomer A relative to the total number of moles of monomer used in the first stage. The proportion of the monomer B in the block B is the ratio of the number of moles of the monomer B relative to the total number of moles of monomer used in the second stage.

In the monomer configurations shown in Table 7, A-AB represents a copolymer composed of a block containing the monomer A and a block containing the monomer A and the monomer B, whereas A-B represents a copolymer of a block containing the monomer A and a block containing the monomer B.

(Step (2): Preparation of Amine-Modified Methacrylic Block Polymer (AmPA-(A)B))

The formulation and physical properties of the amine-modified methacrylic block polymer are shown in Table 8.

Following the reaction for producing the methacrylic block polymer PA1-B, the methacrylic block polymer PA1-B having a non-volatile fraction of 40% and diethanolamine (manufactured by Wako Pure Chemical Industries, Ltd.) were placed in a round-bottom flask in accordance with the formulation shown in Table 8, and stirred under heating at 110° C. for 3 hours, yielding an amine-modified methacrylic block polymer AmPA1-B with a non-volatile fraction of 40%.

The weight-average molecular weight of the thus obtained amine-modified methacrylic block polymer AmPA1-B was the same as that of the methacrylic block polymer PA1-B.

In Table 8, the molar ratio of the diethanolamine relative to the monomer B was determined from the respective amounts added.

Details relating to each of the monomers shown in the tables are as follows.

Dodecyl methacrylate: molecular weight 254, carbon number of the alkyl group 12, manufactured by Wako Pure Chemical Industries, Ltd.

Glycidyl methacrylate: molecular weight 142, manufactured by Wako Pure Chemical Industries, Ltd.

The thus obtained amine-modified methacrylic block polymer AmPA1-B was used as the basic dispersant 2.

TABLE 6

First stage: formulation and physical properties of methacrylic polymer PA

| | Units: g | PA1 |
|---|---|---|
| Monomer A | Dodecyl methacrylate | 30.92 |
| RAFT agent | 2-cyano-2-propyl dodecyl trithiocarbonate | 1.00 |
| Polymerization initiator | ABN | 0.48 |
| Polymerization solvent | Isopar M | 48.60 |
| | Total (mass %) | 81.00 |
| | Non-volatile fraction (mass %) | 40.00 |
| | Weight-average molecular weight | 11,000 |

TABLE 7

Second stage: formulation physical properties of methacrylic block polymer PA-(A)B

| | Units: g | PA1-B |
|---|---|---|
| | Monomer configuration | A-AB |
| Polymer PA | PA1 (non-volatile fraction 40%) | 50.00 |
| Monomer A | Dodecyl methacrylate | 9.54 |
| Monomer B | Glycidyl methacrylate | 5.34 |
| Polymerization initiator | AIBN | 0.27 |
| Polymerization solvent | Isopar M | 22.75 |
| | Total (mass %) | 87.92 |
| | Non-volatile fraction (mass %) | 40.00 |
| | Weight-average molecular weight | 20,000 |
| Monomer composition | Monomer A (mol) | 0.12 |
| | Monomer B (mol) | 0.04 |
| Monomer A:Monomer B molar ratio | | 3:1 |
| Block A:Block B molar ratio | | 1:1 |
| Monomer A within block A (mol %) | | 100 |
| Monomer B within block B (mol %) | | 50 |

TABLE 8

Formulation and physical properties of amine-modified methacrylic block polymer

| Units: g | AmPA1-B |
|---|---|
| Methacrylic block polymer PA1-B (non-volatile fraction 40%) | 50.00 |
| Diethanolamine (DEA) | 2.20 |
| Isopar M | 3.30 |
| Total (g) | 55.50 |

TABLE 8-continued

Formulation and physical properties of amine-modified methacrylic block polymer

| Units: g | AmPA1-B |
|---|---|
| Non-volatile fraction (mass %) | 40.00 |
| Molar ratio of DEA relative to monomer B (equivalents) | 0.98 |

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A colored resin particle dispersion comprising: colored resin particles; a basic dispersant; and a non-aqueous solvent,
wherein the colored resin particles comprise a colorant and at least one of (a) a phosphorylated solid resin that comprises a phosphorylated polyvinyl alcohol and/or a phosphorylated polyvinyl acetal resin and (b) a nitrated solid resin.

2. The colored resin particle dispersion according to claim 1, wherein the colored resin particles comprise the phosphorylated solid resin.

3. The colored resin particle dispersion according to claim 1, wherein the colored resin particles comprise the nitrated solid resin.

4. The colored resin particle dispersion according to claim 2, wherein the phosphorylated solid resin comprises the phosphorylated polyvinyl alcohol.

5. The colored resin particle dispersion according to claim 2, wherein the phosphorylated solid resin comprises the phosphorylated polyvinyl acetal resin.

6. The colored resin particle dispersion according to claim 1, wherein the colored resin particles comprise the nitrated solid resin, and the nitrated solid resin comprises a nitrocellulose.

7. The colored resin particle dispersion according to claim 1,
wherein the colored resin particles further comprise at least one liquid compound selected from among liquid polyesters, liquid polyethers, and liquid (meth)acrylic polymers.

8. The colored resin particle dispersion according to claim 7,
wherein the colored resin particles comprise the liquid polyester.

9. The colored resin particle dispersion according to claim 7,
wherein the colored resin particles comprise the liquid polyether.

10. The colored resin particle dispersion according to claim 7,
wherein the colored resin particles comprise the liquid (meth)acrylic polymer.

11. An inkjet ink comprising the colored resin particle dispersion according to claim 1.

12. A colored resin particle dispersion comprising: colored resin particles; a basic dispersant; and a non-aqueous solvent,
wherein the colored resin particles comprise a colorant and at least one of (a) a phosphorylated solid resin and (b) a nitrated solid resin, the average particle size of the colored resin particles is 1 µm or less, and the colored resin particles further comprise at least one liquid compound selected from among liquid polyesters, liquid polyethers and liquid (meth)acrylic polymers.

13. The colored resin particle dispersion according to claim 12, wherein a total amount of the phosphorylated solid resin and the nitrated solid resin is 10 mass % or greater relative to the total mass of the colored resin particles.

14. The colored resin particle dispersion according to claim 12, wherein the colored resin particles comprise the phosphorylated solid resin, and the phosphorylated solid resin comprises a phosphorylated polyvinyl alcohol and/or a phosphorylated polyvinyl acetal resin.

15. The colored resin particle dispersion according to claim 12, wherein the colored resin particles comprise the nitrated solid resin, and the nitrated solid resin comprises a nitrocellulose.

16. The colored resin particle dispersion according to claim 12, wherein the colored resin particles comprise the liquid polyester.

17. The colored resin particle dispersion according to claim 12, wherein the colored resin particles comprise the liquid polyether.

18. The colored resin particle dispersion according to claim 12, wherein the colored resin particles comprise the liquid (meth)acrylic polymer.

\* \* \* \* \*